(12) United States Patent
Chan

(10) Patent No.: US 10,739,943 B2
(45) Date of Patent: Aug. 11, 2020

(54) ORDERED LIST USER INTERFACE

(71) Applicant: Cisco Technology, Inc., San Jose, CA (US)

(72) Inventor: Gwyneth Hoi Shan Chan, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 225 days.

(21) Appl. No.: 15/376,696

(22) Filed: Dec. 13, 2016

(65) Prior Publication Data

US 2018/0164958 A1  Jun. 14, 2018

(51) Int. Cl.
*G06F 3/00* (2006.01)
*G06F 3/0482* (2013.01)
*G06F 3/0486* (2013.01)

(52) U.S. Cl.
CPC .......... *G06F 3/0482* (2013.01); *G06F 3/0486* (2013.01)

(58) Field of Classification Search
CPC .............................. G06F 3/0482; G06F 3/0486
USPC ........................................................ 715/769
See application file for complete search history.

(56) References Cited

U.S. PATENT DOCUMENTS

| | | | |
|---|---|---|---|
| 5,625,763 A | 4/1997 | Cirne | |
| 6,330,231 B1 | 12/2001 | Bi | |
| 6,415,164 B1 | 7/2002 | Blanchard et al. | |
| 6,453,345 B2 | 9/2002 | Trcka et al. | |
| 6,470,383 B1 | 10/2002 | Leshem et al. | |
| 6,484,261 B1 | 11/2002 | Wiegel | |
| 6,529,218 B2 | 3/2003 | Ogawa et al. | |
| 7,027,052 B1 | 4/2006 | Thorn et al. | |
| 7,036,087 B1 | 4/2006 | Odom | |
| 7,043,702 B2 | 5/2006 | Chi et al. | |
| 7,051,029 B1 | 5/2006 | Fayyad et al. | |
| 7,603,373 B2 | 10/2009 | Error et al. | |
| 7,644,365 B2 | 1/2010 | Bhattacharya et al. | |
| 7,730,223 B1 | 6/2010 | Bavor et al. | |

(Continued)

FOREIGN PATENT DOCUMENTS

| GB | 2 389 017 A | 11/2003 |
|---|---|---|
| JP | 2011-204656 | 10/2011 |

OTHER PUBLICATIONS

Billing, Emily; Show or Hide Controls With Rules in Nintex Forms—Version 5 (May 25, 2014) Can be seen at: https://community.nintex.com/docs/DOC-1074.

(Continued)

*Primary Examiner* — William L Bashore
*Assistant Examiner* — David Faber
(74) *Attorney, Agent, or Firm* — Polsinelli PC

(57) ABSTRACT

In one embodiment, a method includes receiving input data from at least one input device, preparing a user interface including a list of ordered items, a details panel about a first ordered item, and a pointer pointing from the details panel to a first position in the list, interpreting the input data to include moving the first pointer to pointing at a second position in the list, updating the user interface, the updated user interface including the first pointer pointing from the details panel to the second position, interpreting the input data to include confirming placement of the first ordered item for placement in the list according to the second position, and updating the user interface to show the first ordered item placed in the list according to the second position.

21 Claims, 14 Drawing Sheets

(56) References Cited

U.S. PATENT DOCUMENTS

| | | |
|---|---|---|
| 7,792,844 B2 | 9/2010 | Error et al. |
| 7,861,175 B2 | 12/2010 | Wormald et al. |
| 7,921,459 B2 | 4/2011 | Houston et al. |
| 7,945,620 B2 | 5/2011 | Bou-Ghannam et al. |
| 7,958,189 B2 | 6/2011 | Bernstein |
| 8,006,198 B2 | 8/2011 | Okuma et al. |
| 8,037,421 B2 | 10/2011 | Scott et al. |
| 8,140,991 B2 | 3/2012 | Smith et al. |
| 8,245,297 B2 | 8/2012 | Lim |
| 8,325,626 B2 | 12/2012 | Tóth et al. |
| 8,380,359 B2 | 2/2013 | Duchene et al. |
| 8,396,874 B2 | 3/2013 | Shamma et al. |
| 8,402,384 B2 | 3/2013 | Scott |
| 8,423,163 B2 | 4/2013 | Park |
| 8,429,562 B2 | 4/2013 | Gourdol et al. |
| 8,442,693 B2 | 5/2013 | Mirza et al. |
| 8,443,289 B2 | 5/2013 | Sahashi et al. |
| 8,448,076 B2 | 5/2013 | Hammack et al. |
| 8,509,854 B2 * | 8/2013 | Kim .................. G06F 3/04855 455/566 |
| 8,601,375 B2 | 12/2013 | von Eicken et al. |
| 8,619,958 B2 | 12/2013 | Patisaul et al. |
| 8,650,492 B1 | 2/2014 | Mui et al. |
| 8,738,158 B2 | 5/2014 | Sims et al. |
| 8,762,475 B2 | 6/2014 | Cheung et al. |
| 8,839,404 B2 | 9/2014 | Li et al. |
| 8,850,344 B1 * | 9/2014 | Rowlette ............... G06F 3/0486 715/769 |
| 8,868,736 B2 | 10/2014 | Bowler et al. |
| 8,958,318 B1 | 2/2015 | Hastwell et al. |
| 8,972,893 B2 | 3/2015 | Duncan et al. |
| 8,977,794 B2 | 3/2015 | Grohman et al. |
| 8,994,539 B2 | 3/2015 | Grohman et al. |
| 9,112,719 B2 | 8/2015 | Sasaki et al. |
| 9,185,002 B2 | 11/2015 | Sasaki et al. |
| 9,317,778 B2 | 4/2016 | Cordova-Diba et al. |
| 9,318,016 B2 | 4/2016 | Park |
| 9,354,798 B2 | 5/2016 | Sasaki et al. |
| 9,462,041 B1 | 10/2016 | Hagins et al. |
| 9,516,374 B2 | 12/2016 | Cormican et al. |
| 9,584,853 B2 | 2/2017 | Frebourg et al. |
| 9,686,581 B2 | 6/2017 | Cormican et al. |
| 9,733,983 B2 | 8/2017 | Kukreja et al. |
| 9,891,802 B2 * | 2/2018 | Schulz ................ G06F 3/04847 |
| 9,900,224 B2 | 2/2018 | Dumitriu et al. |
| 9,985,837 B2 | 5/2018 | Rao et al. |
| 2001/0048373 A1 | 12/2001 | Sandelman |
| 2002/0049749 A1 | 4/2002 | Helgeson et al. |
| 2002/0087976 A1 | 7/2002 | Kaplan et al. |
| 2003/0035075 A1 | 2/2003 | Butler et al. |
| 2003/0229529 A1 | 12/2003 | Mui et al. |
| 2004/0010561 A1 | 1/2004 | Kim et al. |
| 2004/0034614 A1 | 2/2004 | Asher et al. |
| 2004/0041833 A1 | 3/2004 | Dikhit |
| 2004/0236774 A1 | 11/2004 | Baird et al. |
| 2005/0146534 A1 | 7/2005 | Fong et al. |
| 2006/0005228 A1 | 1/2006 | Matsuda |
| 2006/0129939 A1 | 6/2006 | Nelles et al. |
| 2007/0037563 A1 | 2/2007 | Yang et al. |
| 2007/0038941 A1 * | 2/2007 | Wysocki ............... G06F 3/0482 715/748 |
| 2007/0061486 A1 | 3/2007 | Trinh et al. |
| 2007/0226325 A1 | 9/2007 | Bawa et al. |
| 2007/0239854 A1 | 10/2007 | Janakiraman et al. |
| 2008/0045142 A1 | 2/2008 | Kim |
| 2008/0084888 A1 | 4/2008 | Yadav et al. |
| 2008/0101381 A1 | 5/2008 | Sun et al. |
| 2008/0126930 A1 | 5/2008 | Scott |
| 2008/0127057 A1 | 5/2008 | Costa et al. |
| 2008/0163207 A1 | 7/2008 | Reumann et al. |
| 2008/0165136 A1 * | 7/2008 | Christie ............... G06F 3/0482 345/173 |
| 2008/0168404 A1 * | 7/2008 | Ording .................. G06F 3/0485 715/863 |
| 2008/0219243 A1 | 9/2008 | Silverman |
| 2008/0307451 A1 | 12/2008 | Green |
| 2009/0044185 A1 | 2/2009 | Krivopaltsev |
| 2009/0113331 A1 * | 4/2009 | Smith ...................... G06F 8/34 715/769 |
| 2009/0153288 A1 | 6/2009 | Hope et al. |
| 2009/0157513 A1 * | 6/2009 | Bonev .................. G06Q 10/109 705/14.69 |
| 2009/0307485 A1 | 12/2009 | Weniger et al. |
| 2010/0023865 A1 | 1/2010 | Fulker et al. |
| 2010/0031202 A1 | 2/2010 | Morris et al. |
| 2010/0033422 A1 | 2/2010 | Mucignat et al. |
| 2010/0169755 A1 | 7/2010 | Zafar et al. |
| 2010/0174583 A1 | 7/2010 | Passova et al. |
| 2010/0188328 A1 | 7/2010 | Dodge et al. |
| 2010/0218211 A1 | 8/2010 | Herigstad et al. |
| 2010/0262477 A1 | 10/2010 | Hillerbrand et al. |
| 2010/0275139 A1 | 10/2010 | Hammack et al. |
| 2010/0280637 A1 | 11/2010 | Cohn et al. |
| 2011/0030013 A1 | 2/2011 | Diaz Perez |
| 2011/0050594 A1 | 3/2011 | Kim et al. |
| 2011/0115741 A1 | 5/2011 | Lukas et al. |
| 2011/0142053 A1 | 6/2011 | Van Der Merwe et al. |
| 2011/0179388 A1 * | 7/2011 | Fleizach ............. G06F 3/04883 715/840 |
| 2011/0182295 A1 | 7/2011 | Singh et al. |
| 2011/0185303 A1 | 7/2011 | Katagi et al. |
| 2011/0191303 A1 | 8/2011 | Kaufman et al. |
| 2011/0193788 A1 | 8/2011 | King et al. |
| 2011/0202270 A1 | 8/2011 | Sharma et al. |
| 2011/0208541 A1 | 8/2011 | Wilson et al. |
| 2011/0209089 A1 | 8/2011 | Hinckley et al. |
| 2011/0209104 A1 | 8/2011 | Hinckley et al. |
| 2011/0221777 A1 | 9/2011 | Ke |
| 2011/0239142 A1 | 9/2011 | Steeves et al. |
| 2011/0264286 A1 | 10/2011 | Park |
| 2011/0289475 A1 * | 11/2011 | Sukhenko ................. G06F 8/20 717/103 |
| 2012/0005609 A1 | 1/2012 | Ata et al. |
| 2012/0054367 A1 | 3/2012 | Ramakrishnan et al. |
| 2012/0140255 A1 | 6/2012 | Tanaka |
| 2012/0154138 A1 | 6/2012 | Cohn et al. |
| 2012/0154294 A1 | 6/2012 | Hinckley et al. |
| 2012/0185791 A1 | 7/2012 | Claussen et al. |
| 2012/0185913 A1 * | 7/2012 | Martinez .................. G06F 9/455 726/1 |
| 2012/0192111 A1 | 7/2012 | Hsu et al. |
| 2012/0210349 A1 | 8/2012 | Campana et al. |
| 2012/0235921 A1 | 9/2012 | Laubach |
| 2012/0290940 A1 | 11/2012 | Quine |
| 2012/0291068 A1 | 11/2012 | Khushoo et al. |
| 2012/0324035 A1 | 12/2012 | Cantu et al. |
| 2013/0021281 A1 | 1/2013 | Tse et al. |
| 2013/0024799 A1 | 1/2013 | Fadell et al. |
| 2013/0047125 A1 | 2/2013 | Kangas et al. |
| 2013/0069969 A1 | 3/2013 | Chang et al. |
| 2013/0124523 A1 | 5/2013 | Rogers et al. |
| 2013/0145008 A1 | 6/2013 | Kannan et al. |
| 2013/0145307 A1 | 6/2013 | Kawasaki |
| 2013/0152017 A1 | 6/2013 | Song et al. |
| 2013/0155906 A1 | 6/2013 | Nachum et al. |
| 2013/0159898 A1 | 6/2013 | Knospe et al. |
| 2013/0174191 A1 | 7/2013 | Thompson, Jr. et al. |
| 2013/0179842 A1 | 7/2013 | Deleris et al. |
| 2013/0201215 A1 | 8/2013 | Martellaro et al. |
| 2013/0218987 A1 | 8/2013 | Chudge et al. |
| 2013/0265905 A1 | 10/2013 | Filsfils |
| 2013/0290783 A1 | 10/2013 | Bowler et al. |
| 2013/0322438 A1 | 12/2013 | Gospodarek et al. |
| 2013/0322848 A1 | 12/2013 | Li |
| 2013/0326583 A1 | 12/2013 | Freihold et al. |
| 2013/0347018 A1 | 12/2013 | Limp et al. |
| 2014/0002580 A1 | 1/2014 | Bear et al. |
| 2014/0007089 A1 | 1/2014 | Bosch et al. |
| 2014/0013271 A1 | 1/2014 | Moore et al. |
| 2014/0016926 A1 | 1/2014 | Soto et al. |
| 2014/0025770 A1 | 1/2014 | Warfield et al. |
| 2014/0033040 A1 | 1/2014 | Thomas et al. |
| 2014/0040784 A1 | 2/2014 | Behforooz et al. |

(56) References Cited

U.S. PATENT DOCUMENTS

| | | | |
|---|---|---|---|
| 2014/0089992 A1 | 3/2014 | Varoglu et al. | |
| 2014/0105213 A1 | 4/2014 | A K et al. | |
| 2014/0108614 A1 | 4/2014 | Gunderson et al. | |
| 2014/0108985 A1 | 4/2014 | Scott et al. | |
| 2014/0130035 A1 | 5/2014 | Desai et al. | |
| 2014/0132594 A1 | 5/2014 | Gharpure et al. | |
| 2014/0176479 A1 | 6/2014 | Wardenaar | |
| 2014/0198808 A1 | 7/2014 | Zhou | |
| 2014/0201681 A1 | 7/2014 | Mahaffey et al. | |
| 2014/0258925 A1* | 9/2014 | Peloquin | G06F 3/0481 715/808 |
| 2014/0269321 A1 | 9/2014 | Kamble et al. | |
| 2014/0280133 A1 | 9/2014 | Dulitz | |
| 2014/0281012 A1 | 9/2014 | Troxler et al. | |
| 2014/0282213 A1 | 9/2014 | Musa et al. | |
| 2014/0298210 A1 | 10/2014 | Park et al. | |
| 2014/0310623 A1 | 10/2014 | O'Connell, Jr. et al. | |
| 2014/0310653 A1* | 10/2014 | Han | G06F 3/0482 715/810 |
| 2014/0320387 A1 | 10/2014 | Eriksson et al. | |
| 2014/0337824 A1 | 11/2014 | St. John et al. | |
| 2014/0373064 A1 | 12/2014 | Ray | |
| 2015/0006296 A1 | 1/2015 | Gupta et al. | |
| 2015/0012881 A1 | 1/2015 | Song et al. | |
| 2015/0019991 A1 | 1/2015 | Kristjansson | |
| 2015/0030024 A1 | 1/2015 | Venkataswami et al. | |
| 2015/0032272 A1* | 1/2015 | Neesen | G06F 3/0484 700/284 |
| 2015/0043581 A1 | 2/2015 | Devireddy et al. | |
| 2015/0058314 A1 | 2/2015 | Leclerc et al. | |
| 2015/0074735 A1 | 3/2015 | Herigstad et al. | |
| 2015/0081701 A1 | 3/2015 | Lerios et al. | |
| 2015/0082217 A1* | 3/2015 | Tumwattana | G06F 3/0485 715/769 |
| 2015/0113412 A1 | 4/2015 | Peyton et al. | |
| 2015/0121436 A1 | 4/2015 | Rango et al. | |
| 2015/0128046 A1 | 5/2015 | Cormican et al. | |
| 2015/0128050 A1 | 5/2015 | Cormican et al. | |
| 2015/0163192 A1 | 6/2015 | Jain et al. | |
| 2015/0169208 A1 | 6/2015 | Cho | |
| 2015/0193549 A1 | 7/2015 | Frye et al. | |
| 2015/0212717 A1 | 7/2015 | Nair et al. | |
| 2015/0220238 A1* | 8/2015 | Heo | G06F 3/0486 715/752 |
| 2015/0301697 A1* | 10/2015 | Petrell | G06F 3/0488 715/823 |
| 2016/0034051 A1 | 2/2016 | Xi et al. | |
| 2016/0054887 A1* | 2/2016 | Tumwattana | G06F 3/0488 715/810 |
| 2016/0063954 A1 | 3/2016 | Ryu | |
| 2016/0154575 A1 | 6/2016 | Xie et al. | |
| 2016/0217113 A1* | 7/2016 | Bartle | G09B 5/00 |
| 2016/0253046 A1 | 9/2016 | Garrison et al. | |
| 2016/0266738 A1* | 9/2016 | Martello | G06F 17/2241 |
| 2016/0364085 A1 | 12/2016 | Henderson et al. | |
| 2016/0381023 A1* | 12/2016 | Dulce | H04L 63/10 726/9 |
| 2017/0242568 A1* | 8/2017 | Van Der Westhuizen | G06F 3/0484 |
| 2017/0322696 A1* | 11/2017 | Hartman | G06F 3/0486 |
| 2018/0143868 A1 | 5/2018 | Johnston et al. | |

OTHER PUBLICATIONS

ChemAxon; MarvinSketch Structure Checker Version @MARVINVERSION@ (viewed 2016).
Lemkin, Peter F.; MAExplorer Reference Manual. MicroArray Explorer—V0.96.31.16 "Millenium" edition (May 5, 2003).
Microsoft; PowerPoint 2013 Quick Guide.
NASA; GMAT User Guide R2015a (2015).
SAP; Creating a Rule Set (Copyright 2014).
SAP; Creating a Catalog (Copyright 2014).
Vince; Clear Is a IOS To-Do App That Has the Best UI I've Seen in a While [Video]—Jan. 27, 2012.
Winegar, Mark; Numbers: Adding Rows (Dec. 28, 2012) Can be seen at: https://www.youtube.com/watch?v=YG8UOrlGDeY.
Zugec, Ivan; Create Custom Visibility Rules in Panels Using Ctools Access Plugins (Aug. 13, 2015).
"AppRF," arubanetworks.com, retrieved Nov. 7, 2017, 12 pages.
"Attractive-jQuery-Circular-Countdown-Timer-Plugin-TimeCircles," Jan. 19, 2015, 1 page.
"Definition of together," Merriam-Webster, 2 pages.
"Flow diagram," http://en.wikipedia.org/wiki/Flow_diagram, retrieved on Jun. 11, 2015, 2 pages.
"GitHub," https://github.com/tejas-rane/CLI-forRYU-Firewall retrieved Nov. 9, 2017.
"Google Gesture Search," Goggle, Jun. 21, 2013.
"Introducing the new Sky+ app for iPad," Sky.com, 2 pages.
"SmartView Tiling User Guide," Savant Systems LLC, Jan. 2014, pp. 1-25.
"Suggestion: Browser "new tab"—cover gesture to include bookmarks," Feb. 11, 2014.
"Tweetbot for MAC," http://tapbots.com/tweetbot/mac/ retrieved Jun. 8, 2015, 3 pages.
"Y! Multi messenger 2.0.0.100," last update Sep. 10, 2013, http://y-multi-messeger.soft32.com.
"Zeebox is your TV sidekick," Zeebox.com, 2012.
Author Unknown, "Sorting Your Chat List," available at https://support.google.com/chat/answer/161035?hl=en, retrieved on Jan. 1, 2014, 2 pages.
Author Unknown, "User Interface—Changing Icon Appearance Based on Frequency of Use (Samsung)—Patent Application—Prior Art Request," available at http://patents.stackexchange.com/questions/4233/user-interface-changing-_icon-appearance-based-on-frequency-of-use-samsung Jul. 26, 2013, 9 pages.
Author Unknown, "Using the Tile View," Visokio, 2013, 3 pages.
Christian, Josh, "Four Images on One Screen!—Make Your Home Theater More Versatile," DSI Entertainment Systems, Inc., Sep. 2, 2010, 2 pages.
Constine, Josh, "Facebook's Relevance-Filtered Chat buddy List, or, Why Users Don't Know Who's Online," Aug. 8, 2011, 9 pages.
DSI Entertainment Systems, "Creston control of a high-end custom home theater design in Los Angeles," youtube.com, Uploaded on Dec. 14, 2010.
Firewall Builder, http://www.fwbuilder.ord/4.0/screenshots.shtml retrieved Nov. 7, 2017, 4 pages.
Galitz, Wilbert O., "The Essential Guide to User Interface Design," second edition, 2002, p. 477-478.
McNamara, Katherine, "Firepower Setup and Policy Creation," Aug. 12, 2016, 2 pages.
Mui, Phil, "Introducing Flow Visualization: visualizing visitor flow," Google Analytics Blog, Oct. 19, 2011, 6 pages.
Neeman, Patrick, "Goggle Is Missing Social and Their Culture May Be to Blame," Jun. 12, 2013, 9 pages.
Pozo, S., et al., "AFPL2, An Abstract Language for Firewall ACLs with NAT support," Jun. 2009, 8 pages.
Residential Systems, Inc "ISE 2014: Savant Systems Displays SmartView Video Tiling Interface," youtube.com, published Feb. 6, 2014.
Residential Systems, Inc., "Savant Video Tiling from Residential Systems, Inc.," youtube.com, posted Dec. 26, 2013.
The Lync Insider, "The "Inside" Perspective on Skype for Business Server 2015, Lync Server 2012, VOIP and UNIFIE . . . " Jun. 8, 2015, 23 pages.
Wagner, Kyle, "The OS X Lion Survival Guide," Jul. 21, 2011, 7 pages.
Wikipedia, "Sankey Diagram," Jun. 11, 2015, 2 pages.
Yu, Toby, "Resizable Contacts Widget Pro," Oct. 7, 2013, 3 pages.

* cited by examiner

ORDERED LIST USER INTERFACE

TECHNICAL FIELD

The present disclosure generally relates to user interfaces, and in particular, but not exclusively to, a user interface including an order list.

BACKGROUND

By way of introduction, in traditional network security device configuration user interfaces, policies may be presented in a list or table format. A policy consists of a list of ordered rules. The number of rules in a policy can go up to hundreds. The ordering of rules is very important to the accuracy of the desired security performance. When adding or editing a rule, especially the rule order in the rule list, an administrator generally needs to understand the context of the overall security policy performance to make sure the addition or editing works correctly. Misplacing a rule in the rule list can be detrimental to the overall network security of the enterprise. However, the context of the policy is often not available in the addition or edit page. To add or edit a rule, in traditional policy table user interfaces, the administrator invokes the add rule or edit rule page by clicking an add/edit rule button or clicking on the rule itself when editing. The add rule or edit rule details page would be a stand-alone page or a panel. The administrator may have to edit the rule order in a different page from the add rule or edit rule page. Even if the rule order may be edited in the add/edit rule details page, the editing of the rule order is performed without the context of the other rules in the list. The administrator may lose context of rule order and how the rules before and after the added/edited rule are being affected. As mentioned above, the order information is very important to the overall security performance but it is not available or visible in the edit rule page. The administrator may have to pivot and cross check between two windows, one having the policy table and one having the edit/add rule page, to ensure mistakes are not made.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
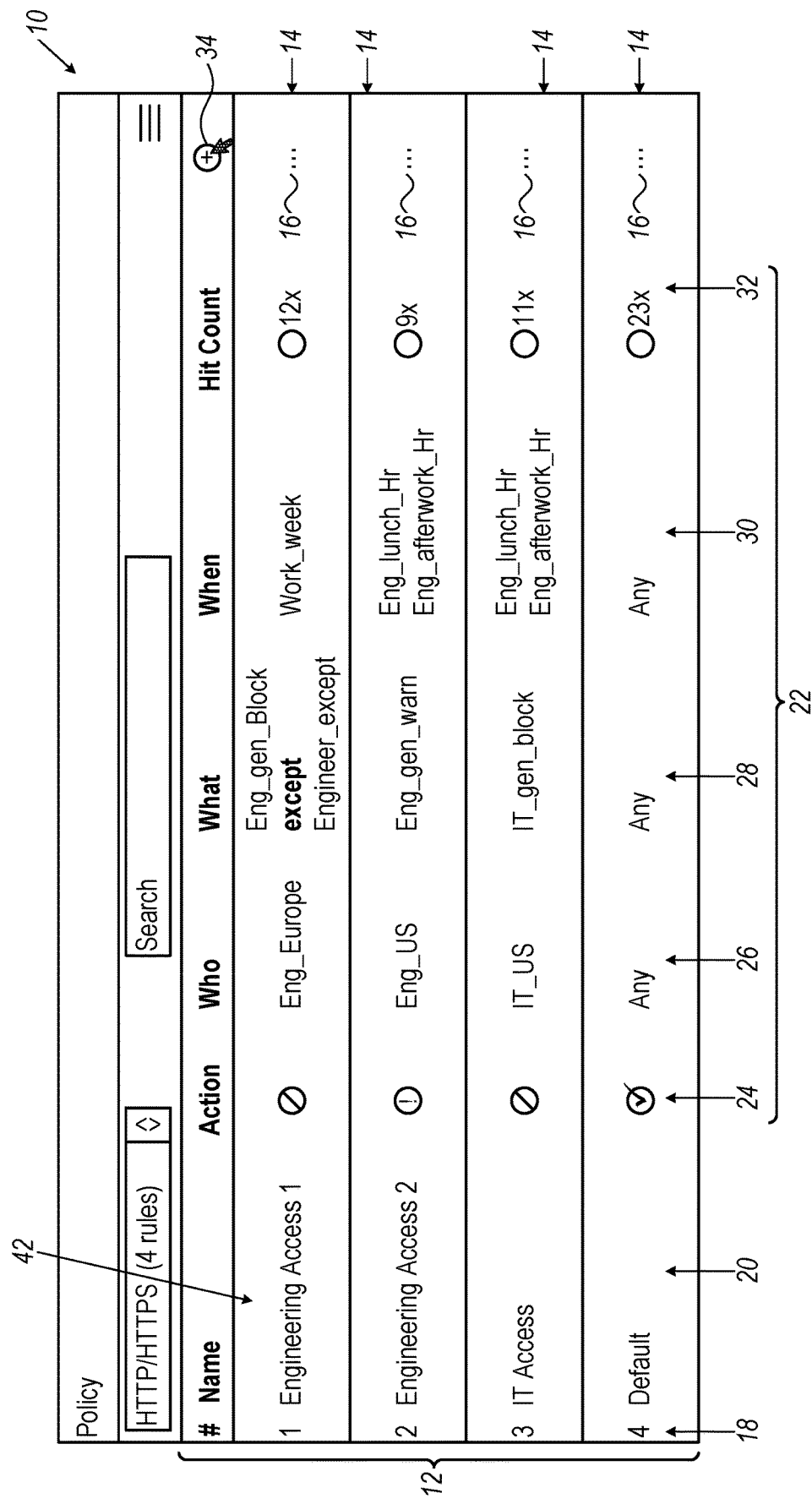
FIG. 1 is a view of a user interface including an ordered item table showing selection of a new item to the ordered item table constructed and operative in accordance with an embodiment of the present disclosure.

There is provided in accordance with an embodiment of the present disclosure, a method including receiving input data from at least one input device, preparing a user interface for output to a display device, the user interface including a list of a plurality of ordered items, a details panel for adding or editing details about a first ordered item, and a first pointer pointing from the details panel to a first position in the list, interpreting the input data to include moving the first pointer from pointing at the first position in the list to pointing at a second position in the list, in response to interpreting the moving, updating the user interface for output to the display device, the updated user interface including the list of the plurality of ordered items, the details panel of the first ordered item, and the first pointer pointing from the details panel of the first ordered item to the second position in the list, interpreting the input data to include confirming placement of the first ordered item for placement in the list of the plurality of ordered items according to the second position, and in response to interpreting the confirming, updating the list, placing the first ordered item in the list of the plurality of ordered items according to the second position, and updating the user interface for output to the display device to show the first ordered item placed in the list according to the second position.

There is also provided in accordance with another embodiment of the present disclosure, a method including receiving input data from at least one input device, preparing a user interface for output to a display device, the user interface including a list of a plurality of ordered items, the user interface being associated with a plurality of hover-over regions which when hovered-over reveal a selectable item, different ones of the plurality of hover-over regions being associated with a different neighboring ordered item pair of the plurality of ordered items, interpreting the input data to include hovering-over one region of the plurality of hover-over regions, the one region being associated with a first ordered item of the plurality of ordered items and a second ordered item of the plurality of ordered items, in response to interpreting the hovering-over the one region, updating the user interface for output to the display device, the updated user interface including the list of the plurality of ordered items and the selectable item associated with adding a new ordered item to the plurality of ordered items between the first ordered item and the second ordered item in the list of the plurality of ordered items, interpreting the input data to include selection of the selectable item, and in response to the interpreting the selection of the selectable item updating the list, inserting the new ordered item between the first ordered item and the second ordered item in the list of the plurality of ordered items, and updating the user interface for output to the display device to show the new ordered item inserted between the first ordered item and the second ordered item in the list.

There is also provided in accordance with still another embodiment of the present disclosure, a method including preparing a user interface for output to a display device, the user interface including a list of a plurality of ordered items, a details panel for adding or editing details about a first ordered item, and a first pointer pointing from the details panel to a first position in the list, updating the user interface for output to the display device, the updated user interface including the list of the plurality of ordered items, the details panel of the first ordered item, and the first pointer pointing from the details panel of the first ordered item to a second position in the list, and updating the user interface for output to the display device to show the first ordered item placed in the list the second position.

DETAILED DESCRIPTION

Reference is now made to FIG. 1, which is a view of a user interface 10 including an ordered item table 12 showing selection of a new item to the ordered item table 12 constructed and operative in accordance with an embodiment of the present disclosure. The user interface 10 may be web or cloud based, server based (via a wireless or wired local-area or wide-area network) or run on a local machine.

By way of overview, as will be seen in the examples of FIGS. 1-12, the user interface 10 allows an administrator to add or edit ordered item (e.g., rule) details and change or assign order item (e.g. rule) positions in the ordered item table 12 via a drag-and-drop mechanism which indicates where a new item is being added or an existing item is being moved to with respect to the overall ordered item table 12. In a security example, the user interface 10 allows an administrator to add or edit rule details and change or assign rule positions via a drag-and-drop mechanism which indicates where a new rule is being added or an existing rule is being moved to with respect to the overall security policy. The user interface 10 allows the administrator to make changes in ordered item order regardless of whether an ordered item is being added or edited without leaving the details panel of the ordered item being added or edited. The user interface 10 reduces the need of second guessing and re-calculating the order number. The user interface 10 reduces the need to pivot between screens and reduces human errors from miscalculation.

The ordered item table 12 of FIG. 1 includes four ordered items 14. Each ordered item 14 has a number 18 (order or priority number), a name 20 (or title) and details 22 including action 24, who 26, what 28, when 30 and hit count 32. Each ordered item 14 may include additional details which may be seen by pressing on a more information button 16. It will be appreciated that the details 22 shown in FIG. 1 are exemplary and any suitable details may be included and will generally depend on the nature of the ordered items 14. The ordered items 14 shown in FIG. 1 are rules used in network security. It will be appreciated that the ordered items 14 may be any suitable rule, instruction or other ordered item, by way of example only.

Each ordered item 14 may be edited by selecting the more information button 16 or by some other selection method, for example, using a suitable selection action such as double clicking or tapping in a touchscreen application on the name 20 of the ordered item 14 to be edited or within the box surrounding the ordered item 14 to be edited. Editing one of the ordered items 14 is described in more detail with reference to FIGS. 6-10.

A new ordered item may be added to the ordered item table 12 by selecting (e.g., by clicking, double clicking or tapping) a new item icon 34. An alternative method for adding a new item is described in more detail with reference to FIGS. 11 and 12. It will be appreciated that any of the selection methods mentioned herein may be replaced by any suitable selection method.

Figure 2:
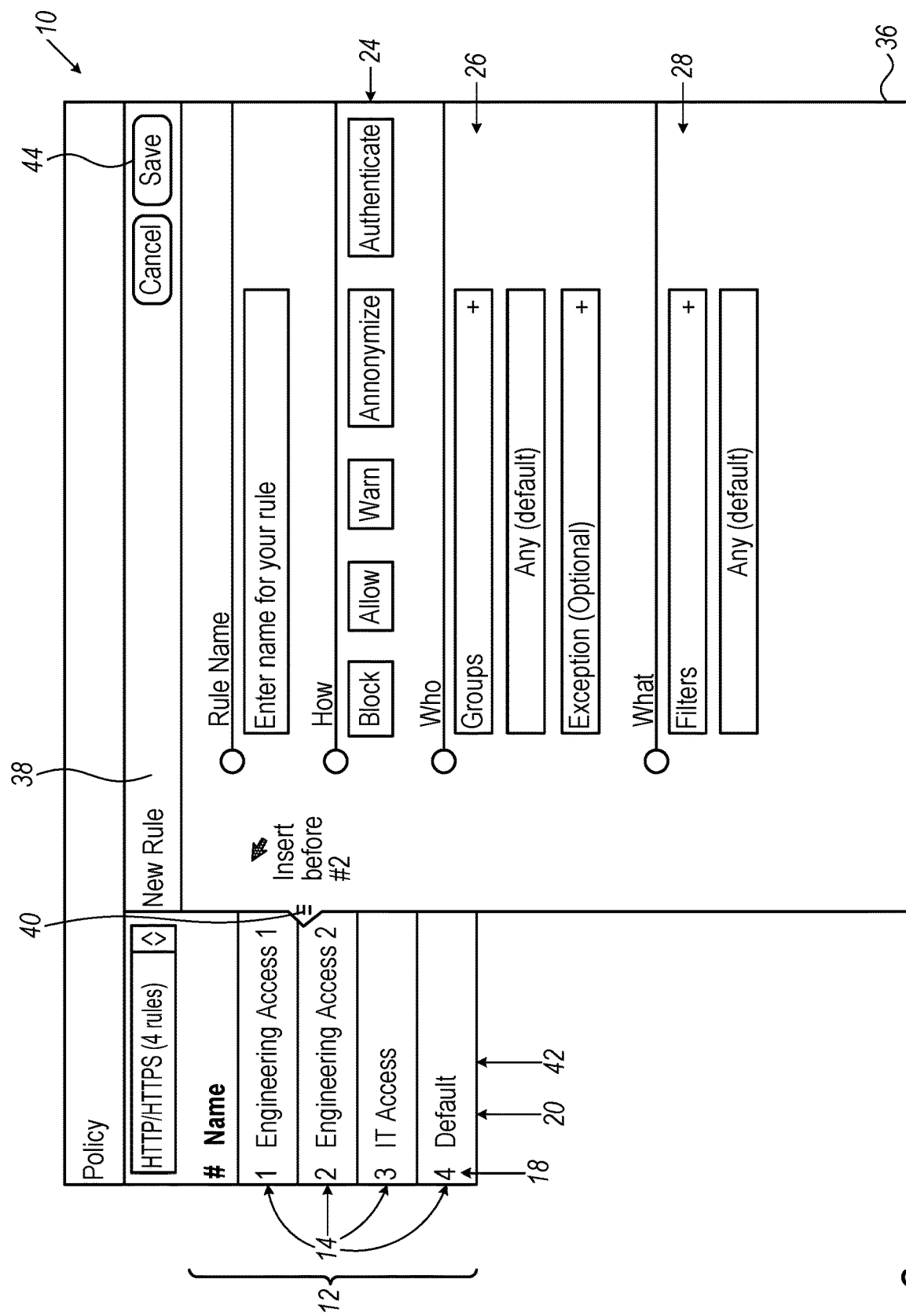
FIG. 2 is a view of the user interface of FIG. 1 showing a details panel of the new item partially overlaying the order item table.

Reference is now made to FIG. 2, which is a view of the user interface 10 of FIG. 1 showing a details panel 36 of a new item 38 (e.g., new rule) partially overlaying the order item table 12. Adding a new item to the ordered item table 12 opens the details panel 36. The order/priority number 18 and name 20 of each ordered item 14 is still visible in the ordered item table 12 even though the other details 22 (FIG. 1) of the ordered item table 12 are overlaid by the details panel 36 of the new item 38. The details panel 36 includes different fields, for example, but not limited to, name 20, action 24, who 26 and what 28. Other suitable fields may be included in the details panel 36 in addition to, or instead of, the fields shown in the details panel 36 of FIG. 2. The fields of the details panel 36 may be filled by an administrator or user, by way of example. A pointer 40 extends from the details panel 36 into a list 42 (including the number 18 and name 20) of the ordered items 14. The pointer 40 indicates where in the list 42 the new item 38 will be placed when a save button 44 of the details panel 36 is selected. The save button 44 also saves any details entered in the fields of the details panel 36. The pointer 40 may also include an alphanumeric description of where the new item 38 will be placed in the list 42 upon saving. The position of the pointer 40 shown in FIG. 2 is an initial default position assigned to new items. It will be appreciated that the initial default position of the new item in the list 42 may be set to any suitable position, for example, but not limited to, the top of the list 42, the bottom of the list 42 or the middle of the list 42.

Figure 3:
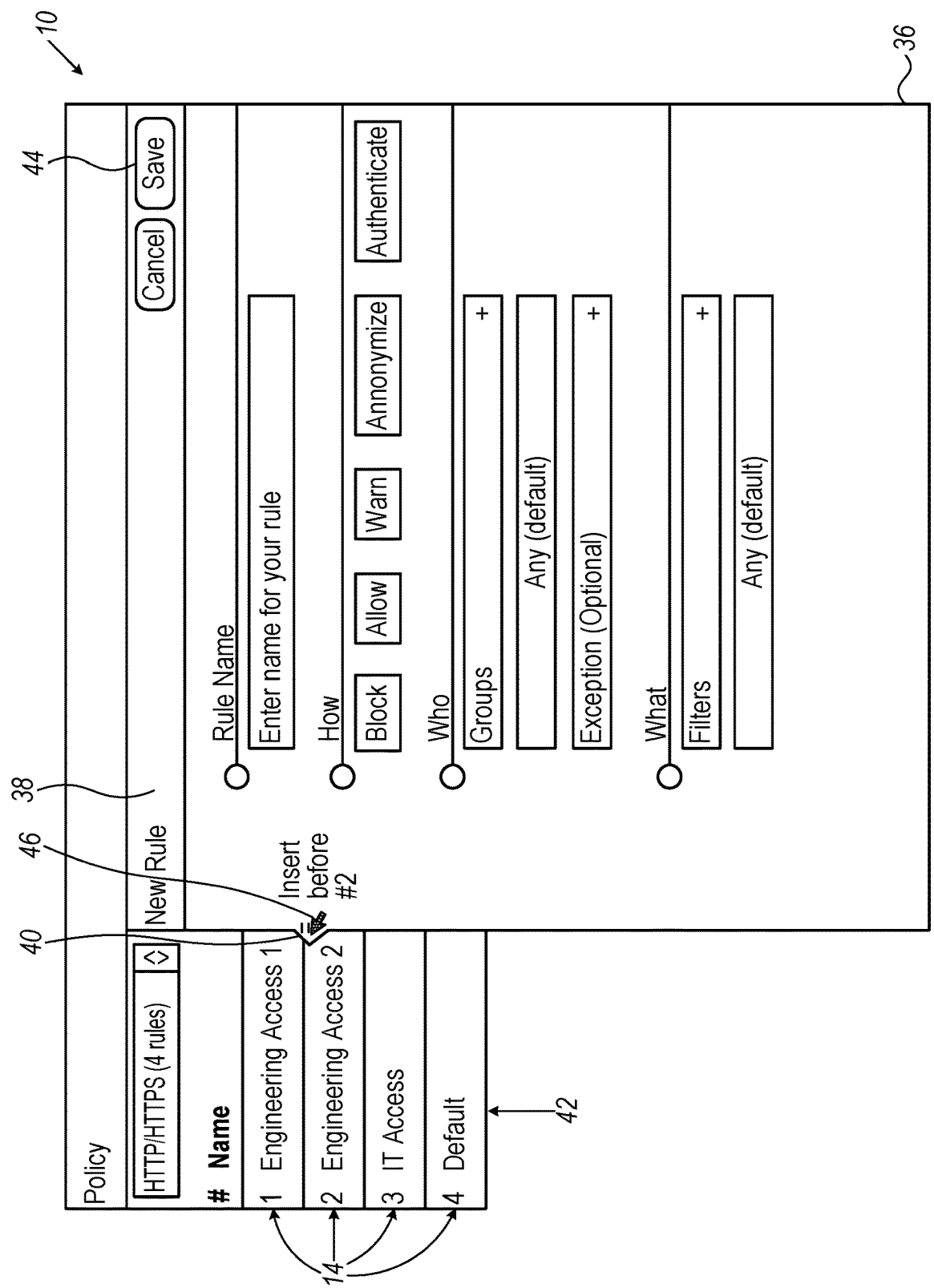
FIGS. 3-5 are views of the user interface with the details panel of FIG. 2 showing drag-and-drop of a pointer.
Figure 4:
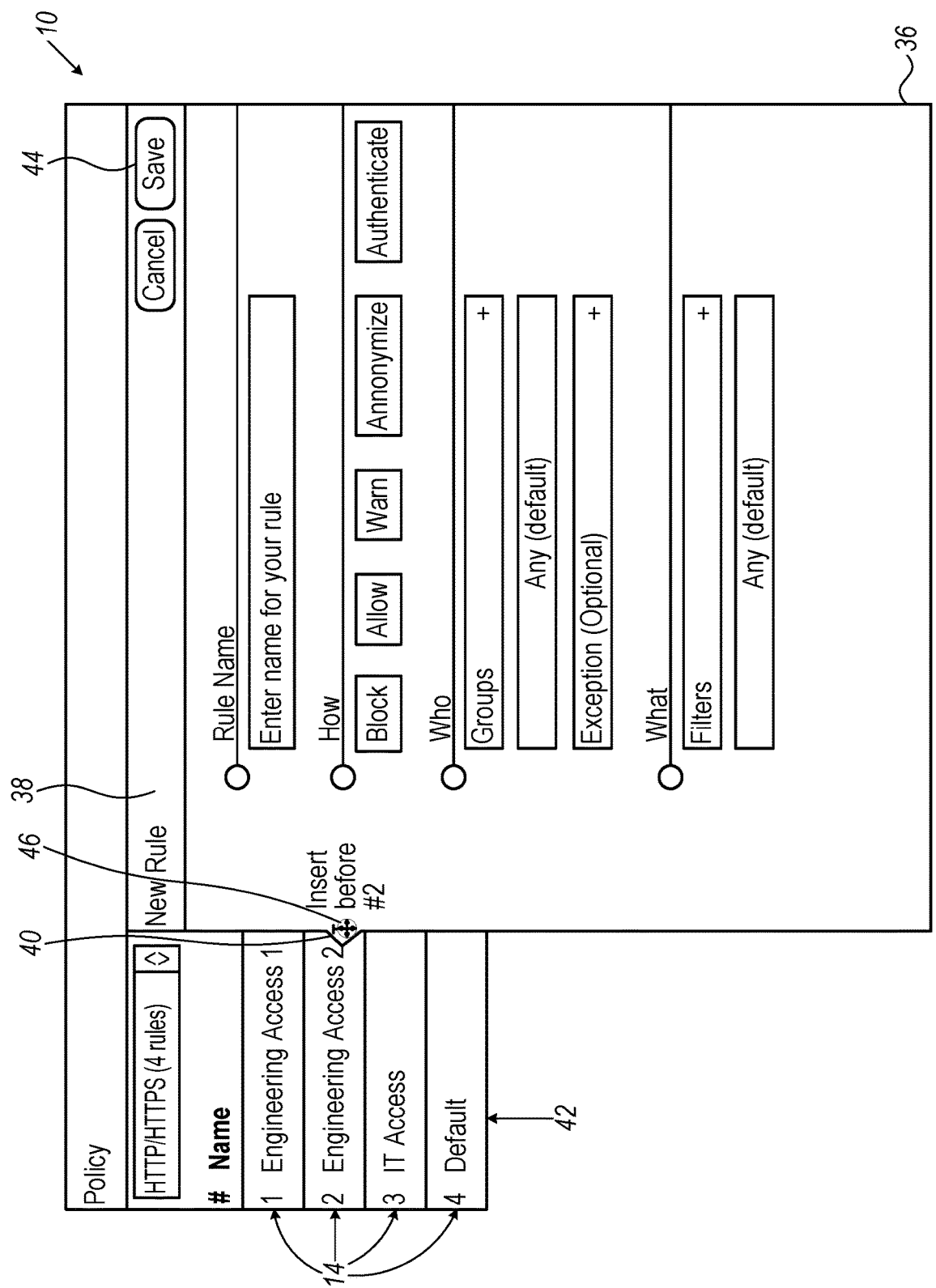
Figure 5:
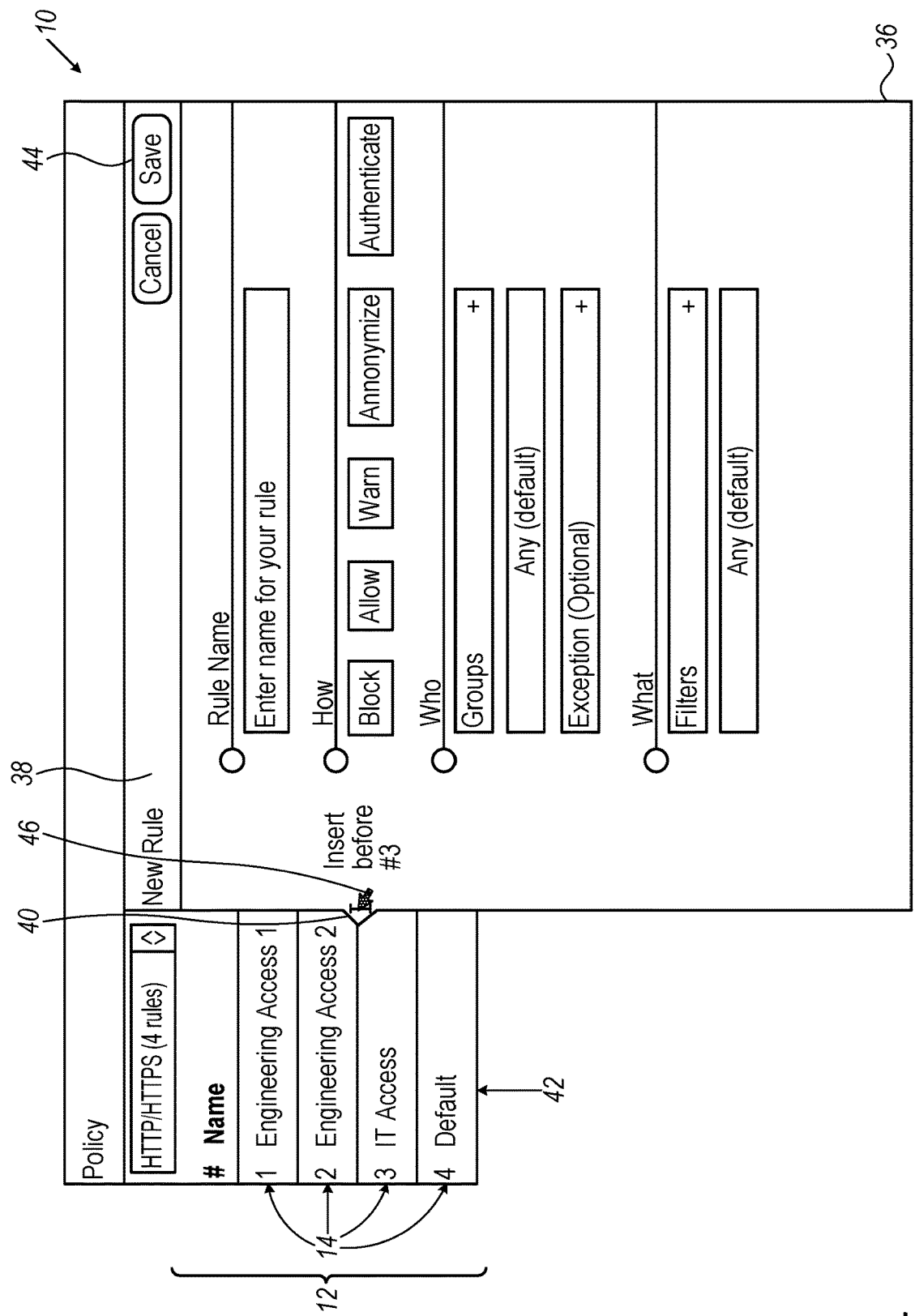

FIGS. 3-5 are views of the user interface 10 with the details panel 36 of FIG. 2 showing drag-and-drop of the pointer 40. The pointer 40 may be triangular or arrow shaped by way of example only. The pointer 40 typically extends from the details panel 36 into the list 42. FIG. 3 shows a cursor 46 placed over the pointer 40. FIG. 4 shows the pointer 40 being dragged down towards item number 3 in the list 42. The symbol of the cursor 46 has also been changed to reflect the dragging of the pointer 40. Reference is now made to FIG. 5, which shows the pointer 40 being dropped just after item number 2. At this position the pointer 40 includes the alphanumeric description "Insert before #3". When the pointer 40 is released, the pointer may snap to a position in the list 42 that the new item 38 would be inserted in the list, for example, between #2 and #3 in the example of FIG. 5. Selecting the save button 44 at this point places the new item 38 between item #2 and item #3 in the list 42. It should be noted that in the examples of FIGS. 3-5, the alphanumeric description only changes when the pointer 40 is within a certain proximity (for example, but not limited to, 5 or 10 pixels) of the end of one of the ordered items 14 in the list 42. However, it will be appreciated that the alphanumeric description of where the new item 38 will be placed in the list 42 on saving may be configured to update based on different criteria. For example, the alphanumeric description may change when the pointer 40 passes a mid-point of any of the ordered items 14. The user interface 10 allows the administrator or user to create a new ordered item or modify an existing ordered item 14 without losing the context of the overall data in the ordered item table 12 as both the details panel 36 and the list 42 of the ordered item table 12 are shown at the same time in the user interface 10. For example, when the ordered items 14 are security rules, the user interface 10 allows the administrator to create a new rule or modify an existing rule without losing the context of the overall security performance of a policy covered by the ordered item table 12. The drag-and-drop pointer 40 clearly communicates to the administrator the position of the new item 38 (e.g., new rule) with respect to the ordering of existing ordered items 14 (e.g., rules). The pointer 40 also prevents errors that commonly happen due to misunderstanding of order number assignment and misplacing an item in the wrong position.

Figure 6:
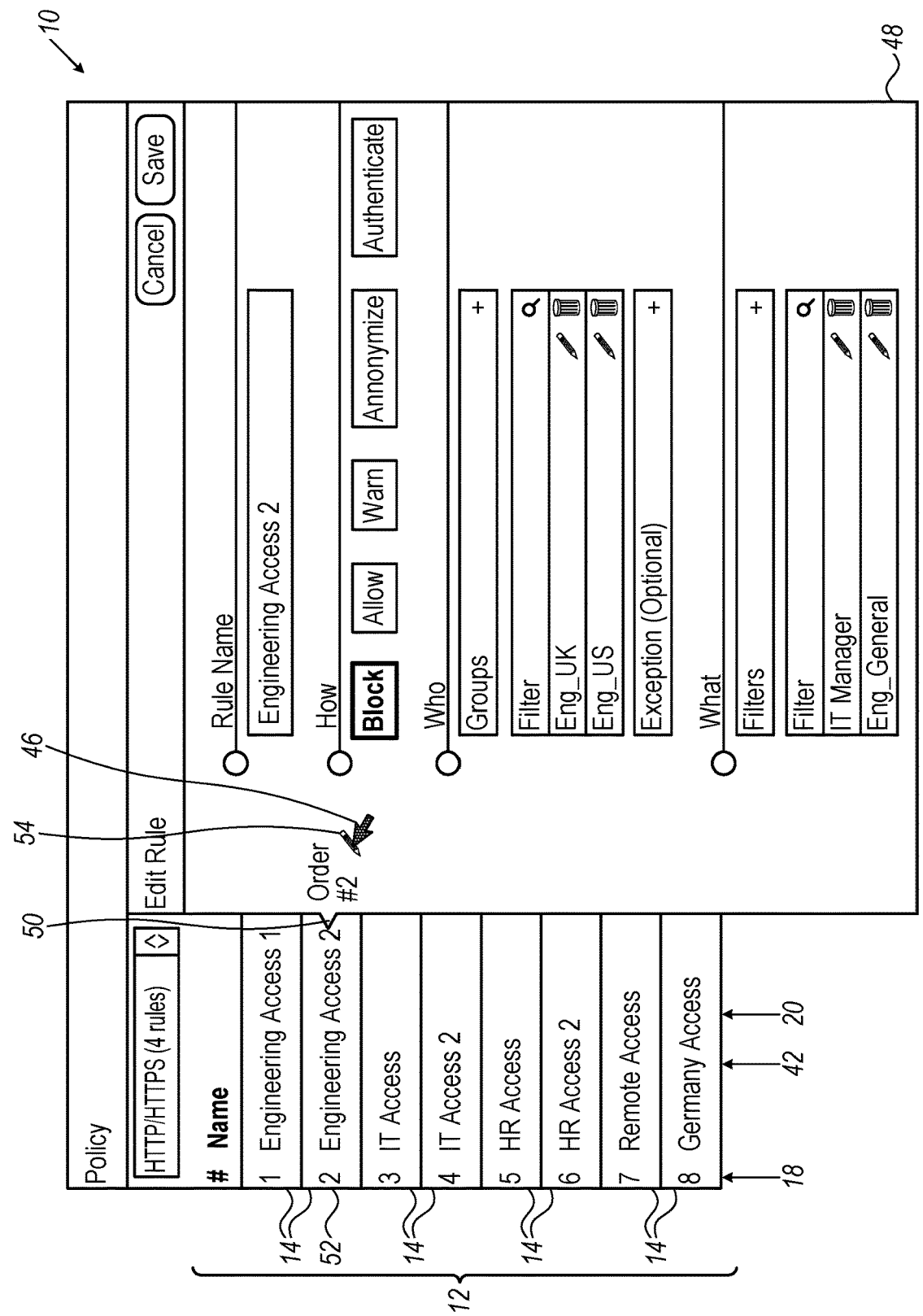
FIG. 6 is a view of the user interface of FIG. 1 showing a details panel of an item being edited partially overlaying the order item table.

Reference is now made to FIG. 6, which is a view of the user interface 10 of FIG. 1 showing a details panel 48, of an ordered item 52 (of the ordered items 14) being edited, partially overlaying the order item table 12. As described above with reference to FIG. 1, selecting edit from the ordered item table 12 for an existing ordered item 14 opens the details panel 48. The details panel 48 includes substantially the same fields as the details panel 36, except that the details panel 48 is entitled "Edit Rule" rather than "New Rule" and typically opens with one or more of the fields previously filled in when the ordered item 48 was added, or previously edited, to the ordered item table 12. The pointer 50 points from the details panel 48 to the number 18 and name 20 of the ordered item 52 in the list 42. The pointer 50 also includes an alphanumeric description of where the pointer 50 is pointing at in the list 42, namely, "Order #2" in the example of FIG. 6. The pointer also includes an edit symbol 54, shown as a pen or pencil in FIG. 6. The cursor 46 is shown as an arrow in the example of FIG. 6. It will be appreciated that the edit symbol 54 and the cursor 46 may be assigned any suitable symbol which may be user selectable from a list of symbols or user-defined.

FIGS. 7-10 are views of the user interface 10 with the details panel 48 of FIG. 6 showing drag-and-drop of the pointer 50.

Figure 7:
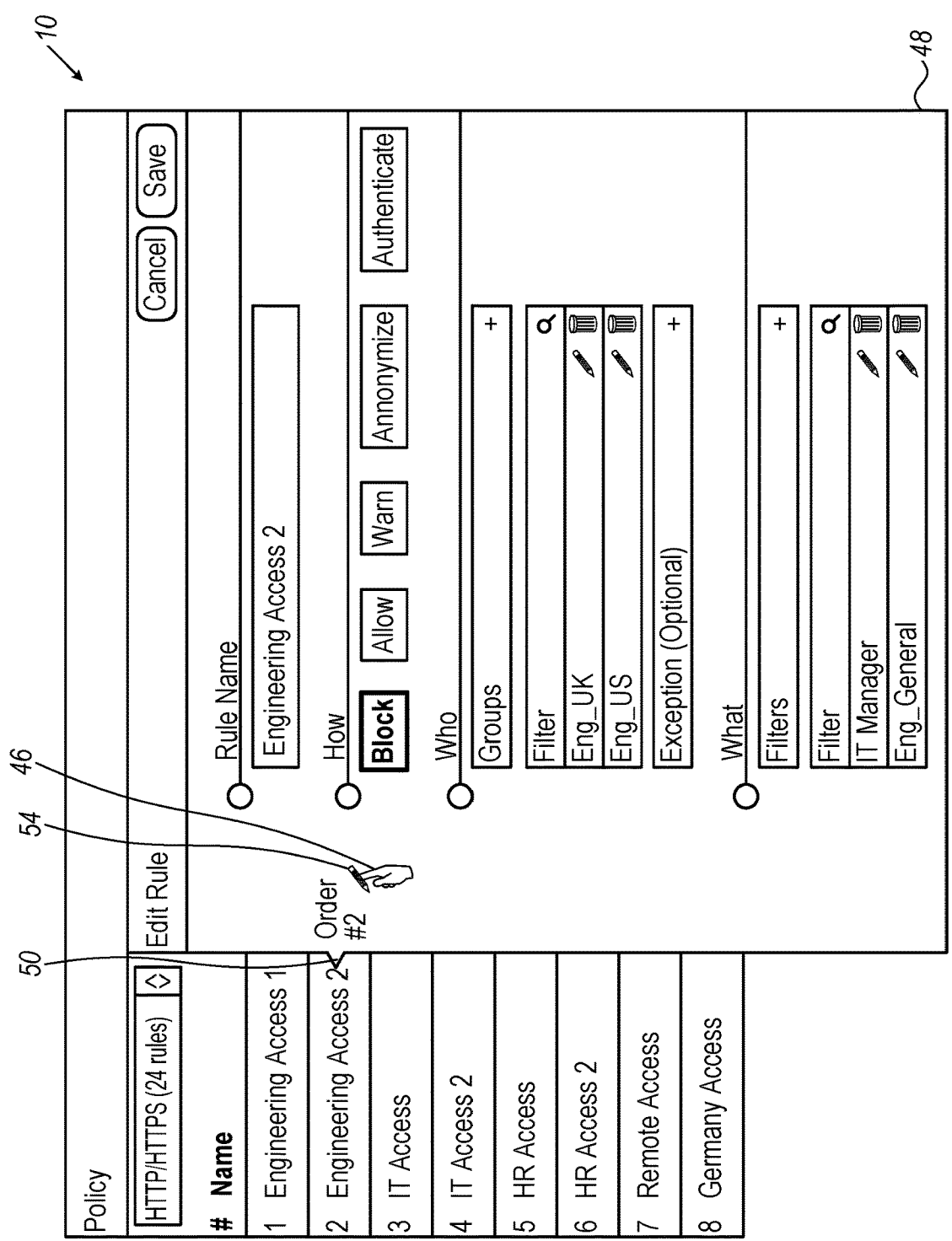
FIGS. 7-10 are views of the user interface with the details panel of FIG. 6 showing drag-and-drop of a pointer.

Reference is now made to FIG. 7 which shows that the cursor 46 is now hovering over the edit symbol 54 and the cursor has changed its symbol, e.g. to a hand in the example of FIG. 7. The edit symbol 54 may then be selected using any suitable selection method, for example, but not limited to, clicking on the edit symbol 54.

Figure 8:
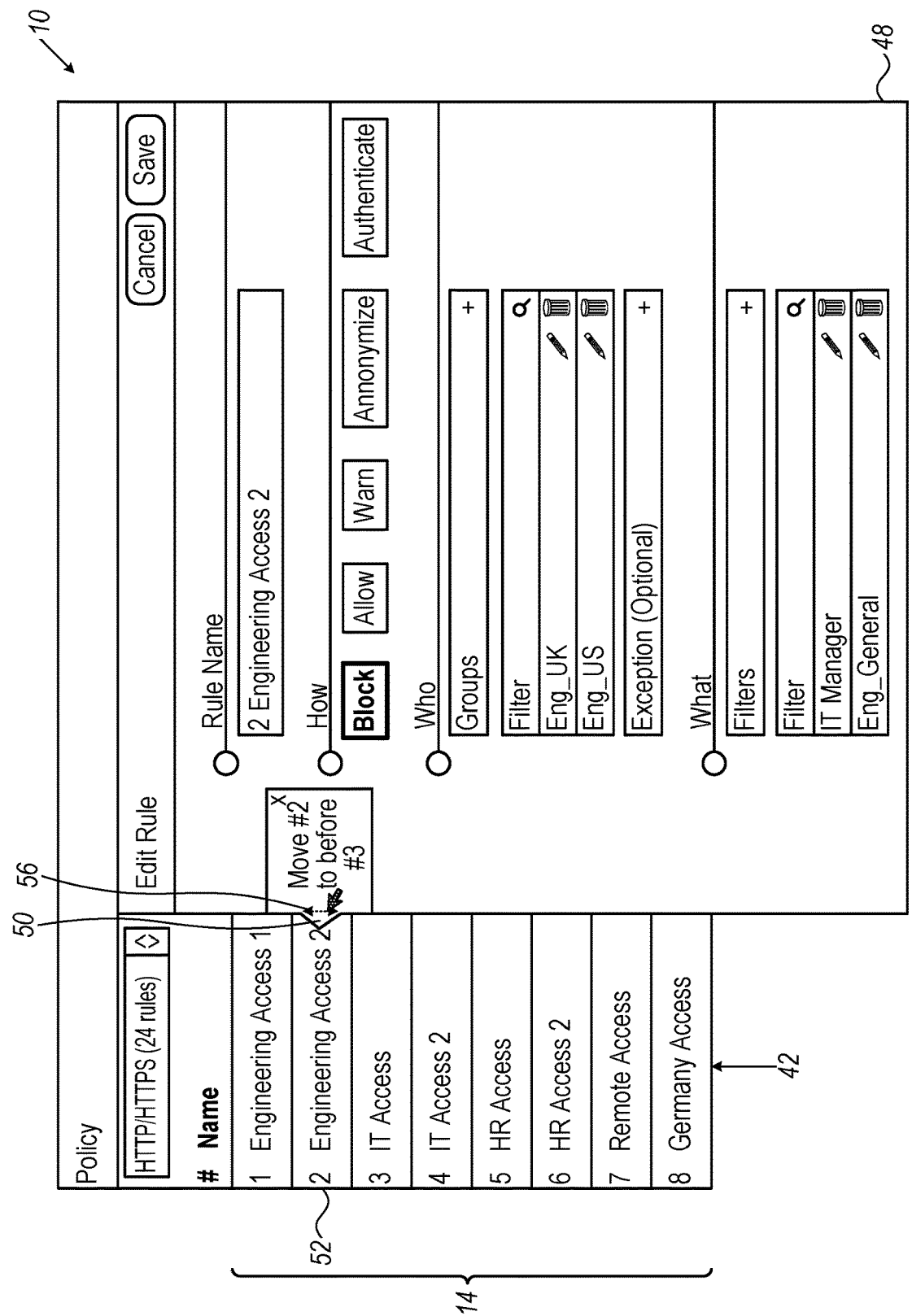

Reference is now made to FIG. 8, which shows that in response to selecting the edit symbol 54 (FIG. 7), the alphanumeric description of the pointer 50 has changed to show the original position of ordered item 52 in the list 42 and where the ordered item 52 will be placed in the list 42 if changes to the details panel 48 are now saved. In the example of FIG. 8, the alphanumeric description is "Move #2 to before #3" which is the original position of the ordered item 52. It will appreciated that the description may not change until the pointer 50 is moved by a certain amount (e.g., half the height of one of the ordered items 14) from the original position of the pointer 50. The pointer 50 also includes up and down arrows 56 to indicate that the pointer 50 may be dragged up and down the list 42.

Figure 9:
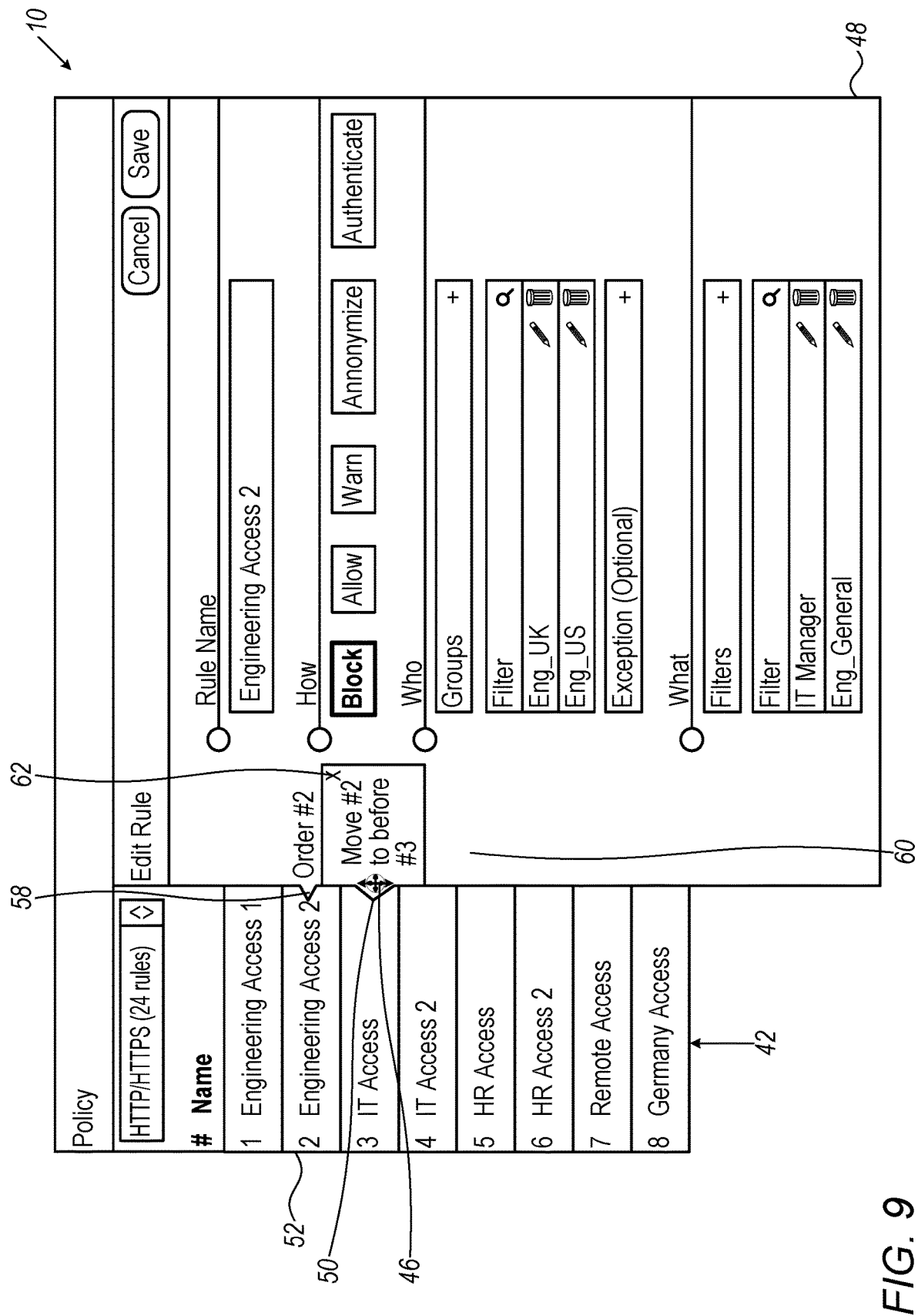

Reference is now made to FIG. 9, which shows that as the pointer 50 is dragged down the list 42, the alphanumeric description of the pointer 50 is changed to reflect where the ordered item 52 will be placed in the list 42 if changes to the details panel 48 are now saved. It will be appreciated that the alphanumeric description of the pointer 50 is changed even when the pointer 50 is dragged up the list 42 to reflect where the ordered item 52 will be placed in the list 42 if changes are now saved. In FIG. 9, the symbol of the cursor 46 has also been changed to reflect the dragging of the pointer 50. Additionally, as the pointer 50 is moved away from its original position, a new pointer 58 is disposed in the user interface 10 to indicate the original position and alphanumeric description of the pointer 50 prior to the pointer 50 being edited. It will be appreciated that the pointer 58 may be excluded from the user interface 10. The pointer 50 may optionally include a border 60 as shown in FIG. 9 and a cancel symbol 62 shown as an "x" in FIG. 9 which may be selected to cancel the dragging operation and move the pointer 50 back to its original position given by the pointer 58.

Figure 10:
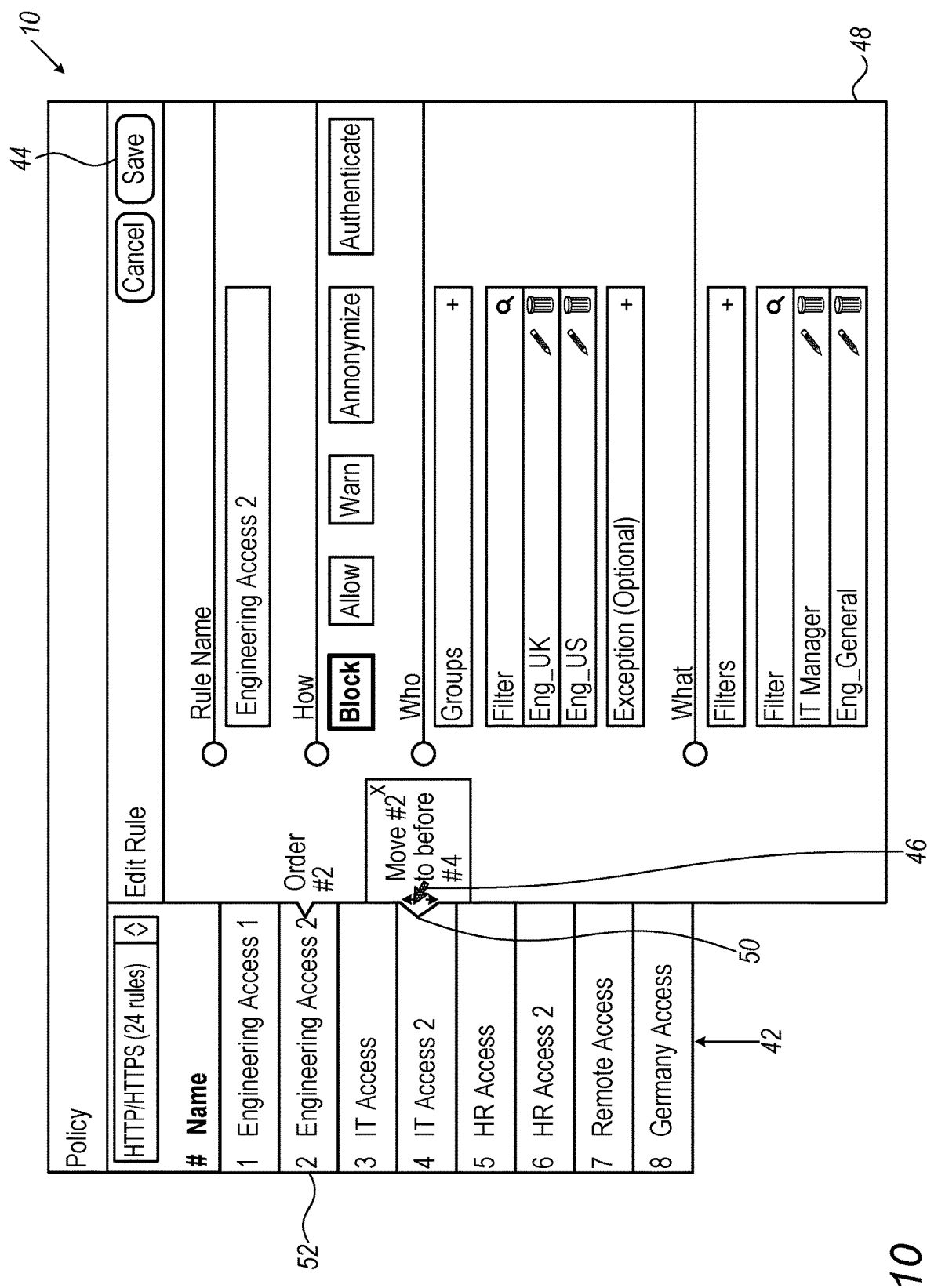

Reference is now made to FIG. 10, which shows that the pointer 50 has now been dropped and the cursor 46 has changed back to an arrow. In the example of FIG. 10, the pointer 50 has been dropped so that the ordered item 52 will be placed in the list 42 before item #4 if changes to the details panel 48 are now saved, for example using the save button 44. It should be noted that the alphanumeric description in the examples of FIGS. 9 and 10 was changed from "Move #2 to before #3" to "Move #2 to before #4" when the pointer 50 moved below item #3 and into #4. It will be appreciated that the positions where the descriptions change from one item number to another may be user defined and may occur when the pointer 50 passes a mid-point of an item or some other point of an item by way of example only.

Figure 11:
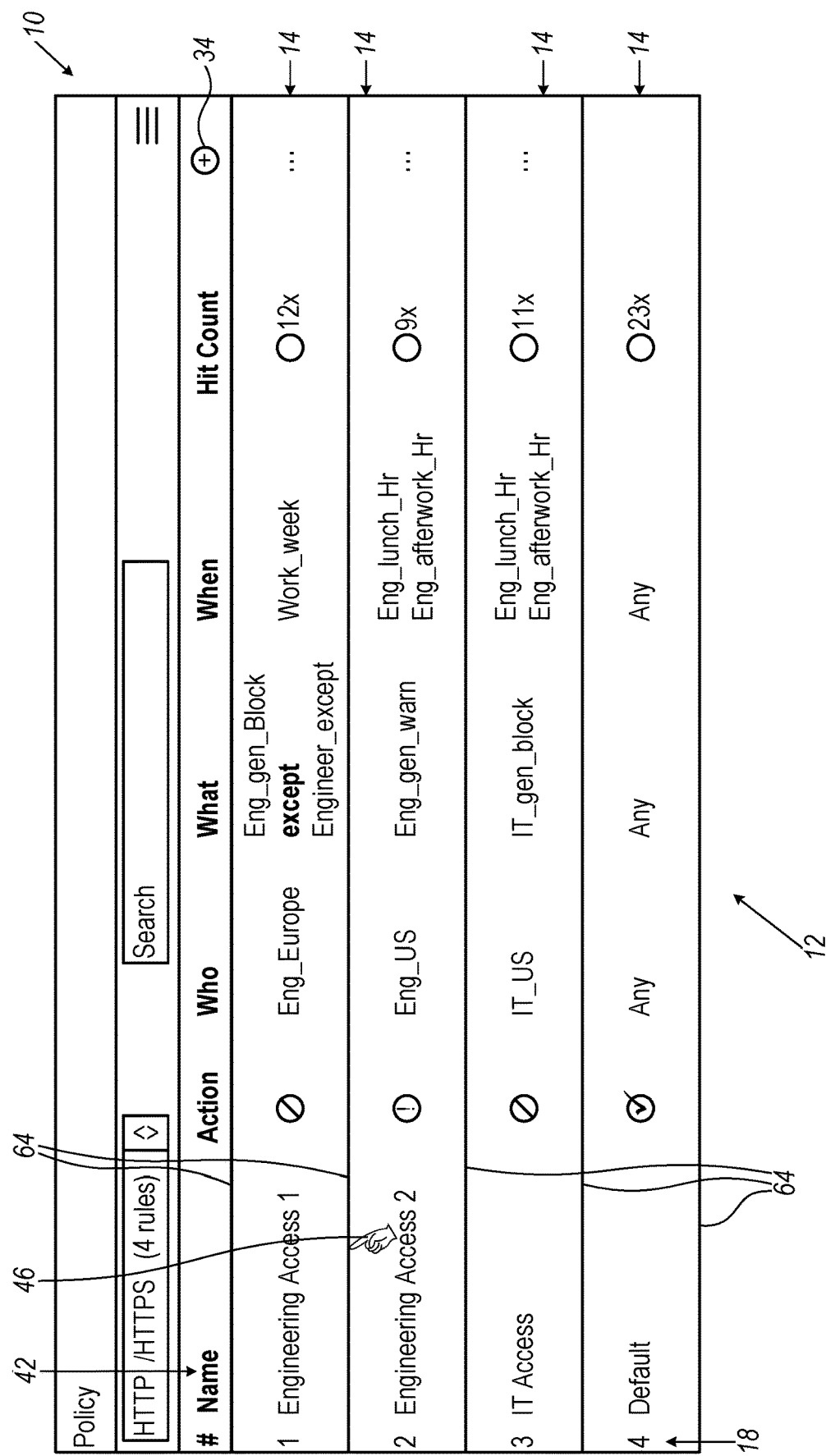
FIGS. 11-12 are views of the user interface of FIG. 1 showing inline addition of a new item.
Figure 12:
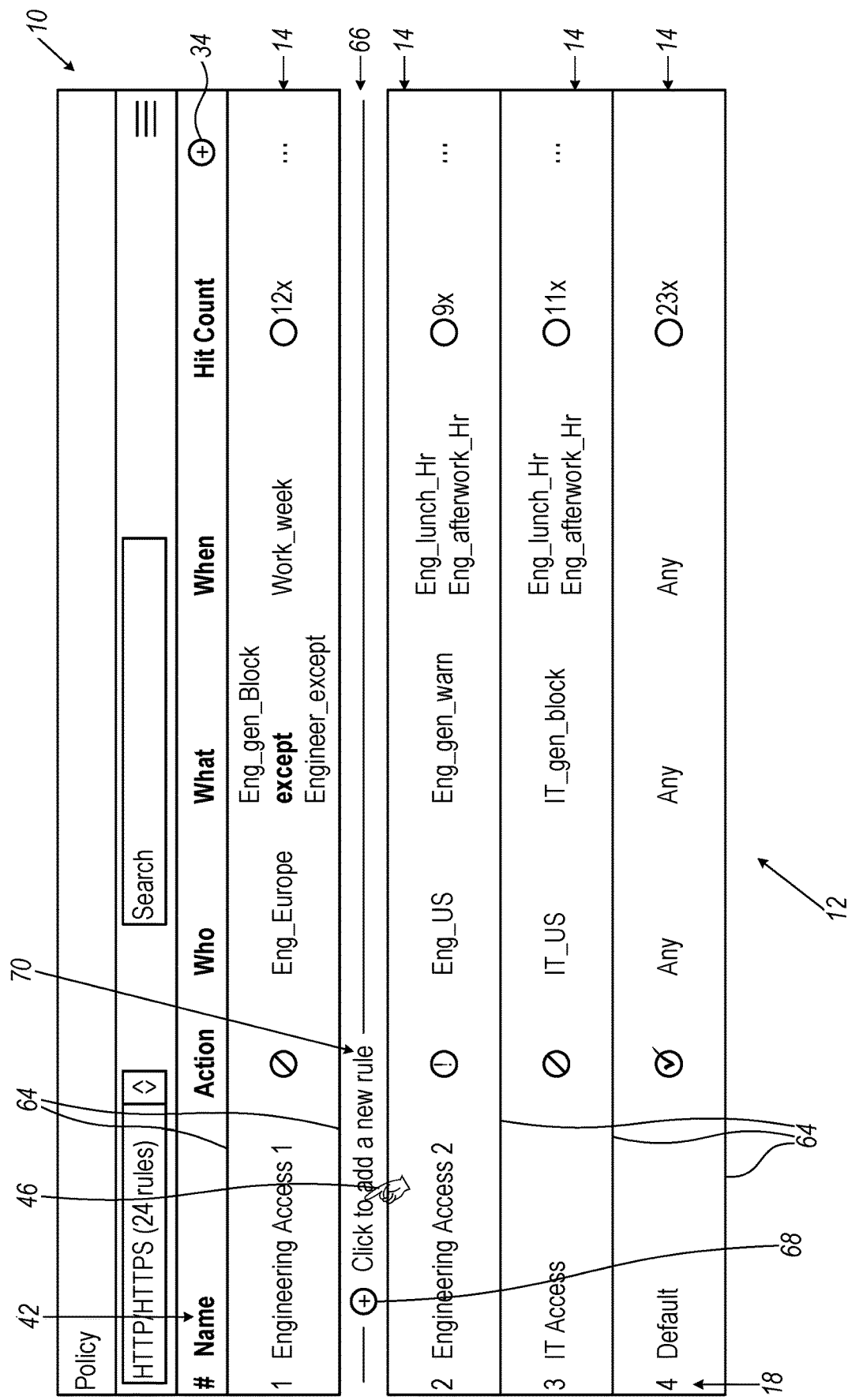

Reference is now made to FIGS. 11-12, which are views of the user interface 10 of FIG. 1 showing inline addition of a new item. Inline addition of a new item may be provided in addition to, or instead of the new item icon 34. Inline addition allows an administrator or user to add a new ordered item (e.g., security rule) exactly at the desired position the administrator or user chooses and allows administrator or user to create a new rule without losing the context of the ordered item table 12 e.g., without losing the context of the overall security performance of the policy. By presenting an inline add button at each potential insertion point, the user interface 10 clearly communicates to the administrator the position of a new item (e.g., rule) with respect to the ordering of existing ordered items 14 (e.g., rules). Inline addition may also prevent errors that commonly happen due to misunderstanding order number and misplacing an item (e.g., rule) in the wrong position. The user interface 10 has a plurality of hover-over regions 64 (FIGS. 11 and 12) which when hovered-over with the cursor 46 reveal a selectable item 66 shown in FIG. 12. The selectable item 66 may include a symbol 68, for example, but not limited to, a "+" symbol and/or a descriptive text 70, for example, but not limited to, "Click to add new rule". The hover-over regions 64 may be disposed between the ordered items 14 and possibly even extending into the ordered items 14 a certain distance. The hover-over regions 64 may also be disposed at the top and bottom of the list 42 to allow adding new items to the top and bottom of the list 42, respectively. The ordered items 14 on either side of the selectable item 66 may move away from each other (either both neighboring ordered items 14 move or one moves) and optionally contract (either one or both of the neighboring ordered items 14) to make space for the selectable item 66 between the ordered items 14 that are adjacent to the selectable item 66. Selecting the selectable item 66 using any suitable selection method, for example, but not limited to, clicking or double clicking, adds a new item in the list 42 at the position of the selectable item 66. The process of adding a new item may also include displaying a details panel for adding details about the new item, for example, the details panel 36 of FIG. 2.

Figure 13:
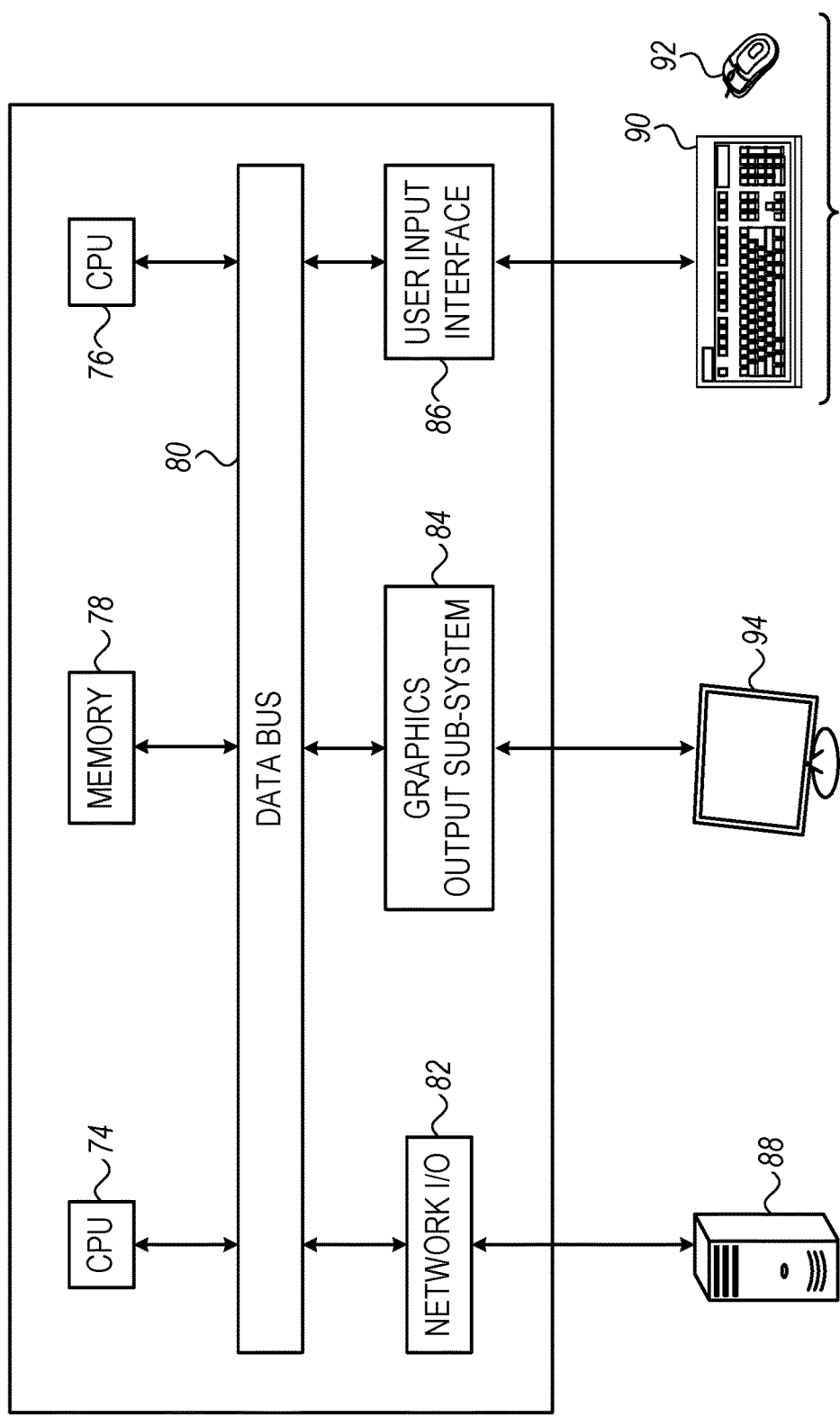
FIG. 13 is a partially block diagram, partially pictorial view of an exemplary system for implementing the user interface of FIGS. 1-12 constructed and operative in accordance with an embodiment of the present disclosure.

Reference is now made to FIG. 13, which is partially block diagram, partially pictorial, view of an exemplary system 72 for implementing the user interface 10 of FIGS. 1-12 constructed and operative in accordance with an embodiment of the present disclosure. The system 72 includes a central processing unit (CPU) 74, a graphics processing unit (GPU) 76, a memory 78, a data bus 80, a network input/output interface 82, a graphics output subsystem 84, a user input interface 86, network devices 88 (only one shown for the sake of simplicity), a keyboard 90, a mouse 92 and a display device 94. The memory 78 is operative to store data used by the central processing unit 74 and the graphics processing unit 76. The data bus 80 is operative to transfer data between the various elements of the system 72. The network input/output interface 82 is operative to exchange data with the network devices 88. The network devices 88 may store and implement items/rules configured by the administrator in the user interface 10, by way of example only. The network input/output interface may be a wired and/or wireless network interface.

The user input interface 86 is operative to receive input data from at least one input device, for example, but not limited to, the keyboard 90, the mouse 92 and/or a touch-screen (not shown). The input data may indicate a screen position (e.g., a screen position of a cursor or a finger or a stylus) and/or a mouse click or an equivalent selection command and/or keyboard input, by way of example only.

The central processing unit 74 is operative to prepare the user interface 10 (FIGS. 1-12) for output to the display device 94. The graphics processing unit 76, may also perform graphics processing of the user interface 10 including customizing the user interface 10 according to specifications of the display device 94. The graphics output sub-system 84 is operative to output the user interface 10 to the display device 94. The display device 94 may be implemented as a stand-alone monitor as shown in FIG. 13, as a display integrated with the system 72, or as a projector and screen arrangement, by way of example only. The graphics processing unit 76 may be implemented in the central processing unit 74.

The central processing unit 74 is also operative to receive the input data from the user input interface 86 and interpret the input data, for example, based on a screen position (e.g., a screen position of a cursor or a finger or a stylus). It will be appreciated that the above described functions of the central processing unit 74 may be implemented using a suitably coded software application running on the central processing unit 74.

Figure 14:
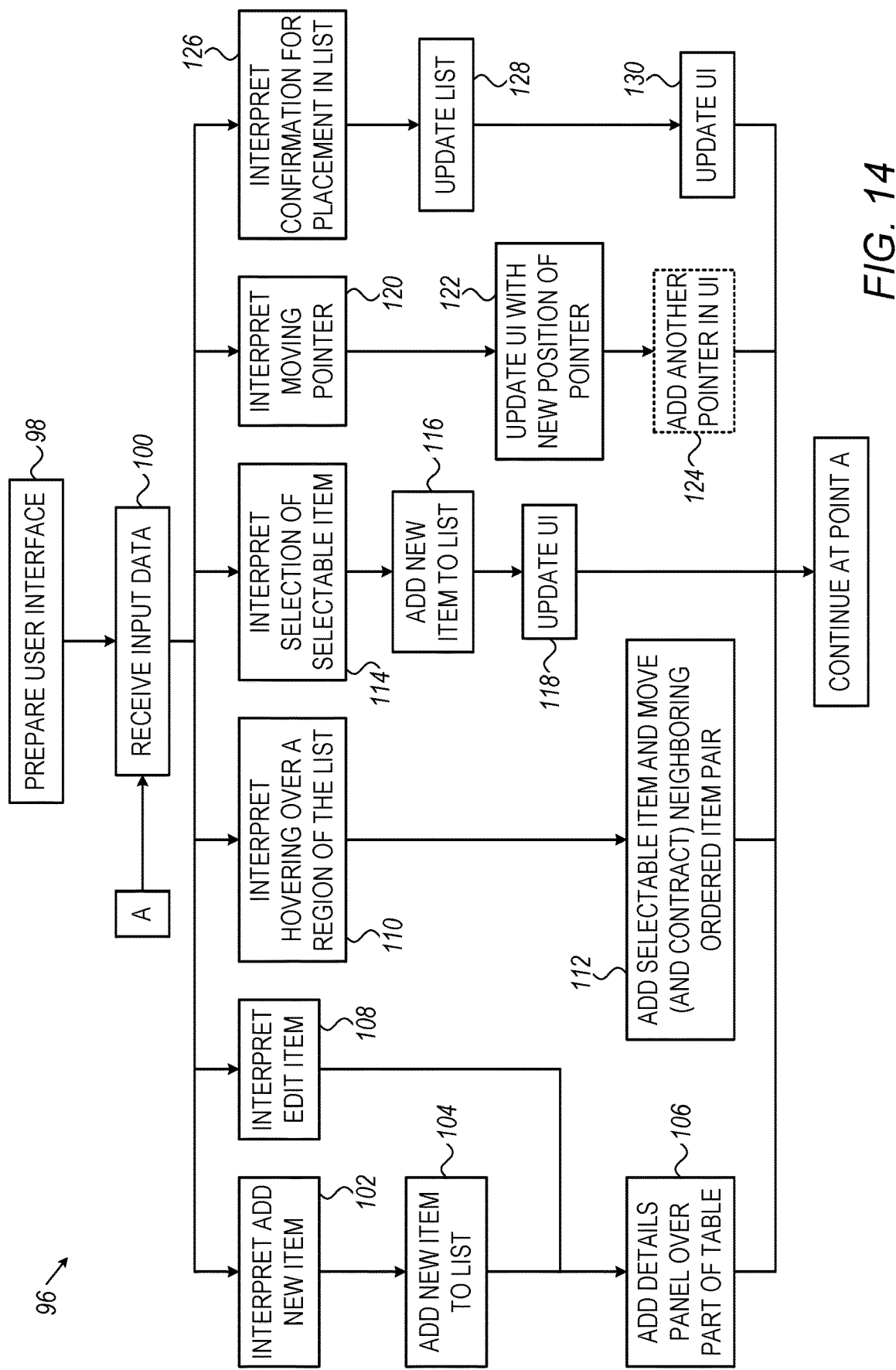
FIG. 14 is a view of a flow chart showing exemplary steps in a method of operation of the system of FIG. 13.

Reference is now made to FIG. 14, which is a view of a flow chart 96 showing exemplary steps in a method of operation of the system 72 of FIG. 13. Reference is also made to FIG. 13.

The central processing unit 74 is operative to prepare a user interface 10 (FIG. 1, 11) for output to the display device 94 (block 98). The user interface 10 includes a list of the ordered items 14 (FIG. 1, 11) disposed in the ordered item table 12 (FIG. 1, 11). The ordered items 14 may be any suitable ordered items, for example, but not limited to, rules or instructions, and in particular, but not exclusively, security rules of a policy. The user input interface 86 is operative to receive input data from at least one input device (e.g., the keyboard 90 and the mouse 92) (block 100).

One way of adding a new item is now described. In response to a selection by the user of the user interface 10, the central processing unit 74 is operative to interpret the input data to include adding a new ordered item to the list 42 (FIG. 1) of the ordered items 14 (FIG. 1) (block 102). The list 42 includes the number 18 (FIG. 1) and name 20 (FIG. 1) of each ordered item 14 (FIG. 1). The central processing unit 74 is operative to add the new ordered item to the list 42 of the ordered items 14 (block 104). The central processing unit 74 is operative to prepare/update the user interface 10 by adding the details panel 36 (FIG. 2) to the user interface 10 (FIG. 2) partially overlaying the ordered item table 12 (FIG. 2) (block 106) leaving the list 42 of the ordered items 14 still visible. The details panel 36 shows fields for filling in about the newly added ordered item. The updated user interface 10 includes the pointer 40 (FIG. 2) pointing from the details panel 36 to a first position in the list 42. The process continues with block 100 where the user input interface 86 is operative to wait for further input data.

Another way of adding a new item is now described. The user interface 10 (FIG. 12) is associated with the hover-over regions 64 (FIG. 12) which when hovered-over reveal the selectable item 66 (FIG. 12). Different hover-over regions 64 are associated with a different neighboring ordered item pair of the ordered items 14 (FIG. 12). The central processing unit 74 is operative to interpret the input data to include hovering-over one hover-over region 64 associated with a first ordered item 14 and a second ordered item 14 (block 110). The terms first ordered item 14 and second order item 14 refer to any pair of neighboring ordered items 14 in the list 42. The terms "first" and "second" are used for convenience and do not necessarily refer to the initial item 14 at the top of the list 42 and another item below the initial item 14. In response to interpreting hovering-over the hover-over region 64, the central processing unit 74 is operative to update the user interface 10 (FIG. 12) for output to the display device 94. The updated user interface 10 includes the list 42 (FIG. 12) of the ordered items 14 (FIG. 12) and the selectable item 66 associated with adding a new ordered item to the ordered items 14 between the first ordered item 14 and the second ordered item 14 in the list 42 of the ordered items 14. Updating the user interface 10 may include the central processing unit 74 updating the user interface 10 by moving the first ordered item and the second ordered item away from each other (either both neighboring ordered items 14 move or one moves), and optionally contracting the first ordered item and/or the second ordered item in height, making space for the selectable item 66 between the first ordered item and the second ordered item in the list 42 of the ordered items 14 (block 112). The process continues with block 100 where the user input interface 86 is operative to wait for further input data, for example, input data related to selection of the displayed selectable item 66. The central processing unit 74 is operative to interpret the input data to include selection of the selectable item 66 (block 114). In response to interpreting the selection of the selectable item 66, the central processing unit 74 is operative to: update the list 42, inserting the new ordered item between the first ordered item 14 and the second ordered item 14 in the list 42 of the ordered items 14 (block 116); and update the user interface 10 for output to the display device 94 to show the new ordered item inserted between the first ordered item 14 and the second ordered item 14 in the list 42. The central processing unit 74 is also operative to prepare/update the user interface 10 by adding the details panel 36 (FIG. 2) to the user interface 10 (FIG. 2) partially overlaying the ordered item table 12 (FIG. 1) (block 118) leaving the list 42 of the ordered items 14 still visible. The details panel 36 includes fields for filling in about the newly added ordered item. The updated user interface 10 includes the pointer 40 (FIG. 2) pointing from the details panel 36 to a first position in the list 42. The process continues with block 100 where the user input interface 86 is operative to wait for further input data.

One way of editing an existing ordered item 14 (FIG. 1) is now described. In response to a selection by the user of the user interface 10 (FIG. 1), the central processing unit 74 is operative to interpret the input data to include editing an existing ordered item 14 in the list 42 (FIG. 1) of the ordered items 14 (block 108). The central processing unit 74 is operative to add the details panel 48 (FIG. 6) to the user interface 10 (FIG. 6) overlaying part of the ordered item table 12 (FIG. 1) (block 106). The details panel 48 shows details about the ordered item 14 being edited. The updated user interface 10 includes the pointer 50 (FIG. 6) pointing from the details panel 48 to a first position in the list 42. The pointer 50 typically extends from the details panel 48 into the list 42. The process continues with block 100 where the user input interface 86 is operative to wait for more input data.

Once the details panel 36 (FIG. 2) or the details panel 48 (FIG. 6) has been displayed (after any of the steps of blocks 106 and 118), the user input interface 86 waits for input data from the user. Input data may relate to filling the various fields in the details panel 36, 48 or to moving the pointer 40, 50 (FIGS. 2, 6). Once relevant input data has been received, the central processing unit 74 may be operative to interpret the input data to include moving the pointer 40, 50 from pointing at the first position in the list 42 to pointing at a second position in the list 42 (block 120). The central processing unit 74 may interpret the input data to include dragging the pointer 40, 50 from pointing at the first position in the list 42 and dropping the pointer 40, 50 to pointing at the second position in the list 42. In response to interpreting the moving or drag and dropping, the central processing unit 74 is operative to update the user interface 10 for output to the display device 94. The updated user interface 10 (FIGS. 5, 10) includes the list 42 (FIGS. 5, 10) of the ordered items 14 (FIGS. 5, 10), the details panel 36, 48 (FIGS. 5, 10) of the ordered item 14 being added/edited, and the pointer 40, 50 (FIGS. 5, 10) pointing from the details panel 36, 48 of the ordered item 14 being added/edited to the second (new) position in the list 42 (block 122).

When an existing ordered item 14 (FIG. 8) is being edited using the details panel 48 (FIG. 9) updating the user interface 10 (FIG. 9) may also include adding the pointer 58 (FIG. 9) to the user interface 10 in additional to the pointer 50 (FIG. 9) so that the updated user interface 10 includes the pointer 50 pointing from the details panel 48 of the ordered item 14 being edited to the second position in the list 42 and the pointer 58 pointing from the details panel 48 of the ordered item being edited to the first position in the list 42 (block 124). The position of the pointer 50 is indicative of where the ordered item 14 being edited will be placed in the list 42 after confirming placement of the ordered item 14 being edited (e.g., by selecting the save button 44 (FIG. 10) or other confirmation button or action). The position of the pointer 58 is indicative of where the ordered item 14 is placed in the list 42 prior to confirming placement of the ordered item 14 being edited.

Once the details panel 36 (FIG. 2) or the details panel 48 (FIG. 6) has been edited and the pointer 40, 50 (FIGS. 2, 6) moved if needed in the steps of blocks 122 and 124, the user may then confirm the changes, for example, but not limited to, by selecting the save button 44 (FIG. 4, 10) or by selecting another confirmation button. The central processing unit 74 may be operative to interpret the input data to include confirming placement of the ordered item 14 (FIGS. 5, 8) being added/edited for placement in the list 42 (FIGS. 5, 10) of the ordered items 14 (block 126) according to the second position. In response to interpreting the confirming, the central processing unit 74 may be operative to: update the list 42, placing the ordered item 14 being added/edited in the list 42 of the ordered items 14 according to the second position (block 128); and update the user interface 10 for output to the display device 94 to show the ordered item 14 being added/edited placed in the list 42 according to the second position (block 130). The ordered item 14 being added/edited may be placed in the list 42 before or after the ordered item 14 that the pointer 50 is pointing to. For example, the user interface 10 may be configured to place the ordered item 14 being added/edited after the ordered item 14 that the pointer 50 is pointing to. Alternatively, the user interface 10 may be configured to place the ordered item 14 being added/edited: (a) after the ordered item 14 that the pointer 50 is pointing to if the pointer 50 is pointing to the bottom half of the ordered item 14 being pointed to; and (b) before the ordered item 14 that the pointer 50 is pointing to if the pointer 50 is pointing to the bottom half of the ordered item 14 being pointed to. If the pointer 50 is pointing to a region between two ordered items 14 then the ordered items 14 being added/edited may be placed between the two ordered items 14 in the list 42.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method comprising:
preparing a user interface for output to a display device, the user interface including a list of a plurality of ordered items, a details panel for adding or editing details about a first ordered item of the plurality of ordered items, and a vertically-draggable pointer pointing from the details panel to a first position in the list, the vertically-draggable pointer extending from the details panel such that a portion of the details panel extends onto the list;
receiving first input data from at least one input device, the first input data interpreted to include moving the vertically-draggable pointer from pointing at the first position in the list to pointing at a second position in the list, the second position having a range extending vertically along a second ordered item of the plurality of ordered items and only along the second ordered item such that positioning the vertically-draggable pointer anywhere along the range is interpreted as the moving and positioning the vertically-draggable pointer anywhere outside of the range is not interpreted as the moving;

in response to interpreting the first input data, updating the user interface for output to the display device, the user interface updated to include the list of the plurality of ordered items, the details panel of the first ordered item, and the vertically-draggable pointer pointing from the details panel of the first ordered item to the second position in the list;

receiving second input data from the at least one input device, the second input data interpreted to include confirming placement of the first ordered item in the list of the plurality of ordered items according to the second position; and in response to interpreting the second input data, updating the list by placing the first ordered item in the list of the plurality of ordered items according to the second position, and updating the user interface for output to the display device to show the first ordered item placed in the list according to the second position.

2. The method according to claim 1, wherein the interpreting includes interpreting the first input data to include dragging the vertically-draggable pointer from pointing at the first position in the list to anywhere along the range and dropping the vertically-draggable first pointer to cause the vertically-draggable pointer to snap to the second position in the list.

3. The method according to claim 1, wherein the list of the plurality of ordered items includes a name of each ordered item of the plurality of ordered items.

4. The method according to claim 1, wherein preparing the user interface includes partially overlaying the details panel of the first ordered item over an item table including the list of the plurality of ordered items and details for each one of the plurality of ordered items.

5. The method according to claim 1, wherein the vertically-draggable pointer includes an alphanumeric description indicating where the first ordered item will be placed in the list of the plurality of ordered items.

6. The method according to claim 1, wherein the plurality of ordered items are a plurality of rules.

7. The method according to claim 6, wherein the plurality of rules are a plurality of security rules.

8. The method according to claim 1, further comprising:
updating the user interface by adding another pointer to the user interface in addition to the vertically-draggable pointer so that the user interface is updated to include the vertically-draggable pointer pointing from the details panel of the first ordered item to the second position in the list and the another pointer pointing from the details panel of the first ordered item to the first position in the list, wherein,
a first pointer position of the vertically-draggable pointer is indicative of where the first ordered item will be placed in the list after confirming placement of the first order item; and
a second pointer position of the another pointer is indicative of where the first ordered item is currently placed in the list prior to the confirming.

9. The method according to claim 1,
wherein
the range includes an upper end defining an uppermost portion of the range,
the range includes a lower end defining a lowermost portion of the range, and
at least one of the upper end or the lower end is not identified via the user interface and is spaced from ends of the second ordered item.

10. A method comprising:
preparing a user interface for output to a display device, the user interface including a list of a plurality of ordered items, the user interface associated with a plurality of hover-over regions which, when hovered-over, reveal a selectable item, different ones of the plurality of hover-over regions associated with different ones of the plurality of ordered items;

receiving first input data from at least one input device, the first input data interpreted to include hovering-over one region of the plurality of hover-over regions, the one region associated with a first ordered item of the plurality of ordered items and a second ordered item of the plurality of ordered items, the one region having a range extending along only one of the first ordered item or the second ordered item such that positioning a vertically-draggable pointer anywhere along the range is interpreted as the hovering-over and positioning the vertically-draggable pointer anywhere outside of the range is not interpreted as the hovering-over;

in response to interpreting the first input data, updating the user interface for output to the display device, the user interface updated to include the list of the plurality of ordered items and the selectable item associated with adding a new ordered item to the plurality of ordered items between the first ordered item and the second ordered item in the list of the plurality of ordered items, the selectable item forming a new space extending between the first ordered item and the second ordered item in the list of the plurality of ordered items;

receiving second input data from the at least one input device, the second input data interpreted to include selection of the selectable item; and in response to interpreting the second input data, updating the list by inserting the new ordered item between the first ordered item and the second ordered item in the list of the plurality of ordered items, and updating the user interface for output to the display device to show the new ordered item inserted between the first ordered item and the second ordered item in the list.

11. The method according to claim 10,
wherein,
in response to the interpreting of the hovering-over the one region, the updating of the user interface includes updating the user interface by moving the first ordered item and the second ordered item from a first configuration to a second configuration,
the first configuration is the first ordered item abutting the second ordered item, and
the second configuration is the first ordered item spaced away from the second ordered item so that the selectable item extends within in the new space formed between the first ordered item and the second ordered item in the list of the plurality of ordered items.

12. The method according to claim 11, wherein in response to the interpreting of the hovering-over the one region, the updating of the user interface includes updating the user interface by contracting at least one of the first ordered item or the second ordered item, making space for the selectable item in the new space formed between the first ordered item and the second ordered item in the list of the plurality of ordered items.

13. The method according to claim 10,
wherein
the range includes an upper end defining an uppermost portion of the range,
the range includes a lower end defining a lowermost portion of the range, and
at least one of the upper end or the lower end is not identified via the user interface and is spaced from ends of the second ordered item.

14. A system comprising:
a user input interface configured to receive input data from at least one input device; and
a processor configured to:
prepare a user interface for output to a display device, the user interface including a list of a plurality of ordered items, a details panel for adding or editing details about a first ordered item of the plurality of ordered items, and a vertically-draggable pointer pointing from the details panel to a first position in the list, the vertically-draggable pointer extending from the details panel such that a portion of the details panel extends onto the list;
receive first input data from at least one input device, the first input data interpreted to include moving the vertically-draggable pointer from pointing at the first position in the list to pointing at a second position in the list, the second position having a range extending vertically along a second ordered item of the plurality of ordered items and only along the second ordered item such that positioning the vertically-draggable pointer anywhere along the range is interpreted as the moving and positioning the vertically-draggable pointer anywhere outside of the range is not interpreted as the moving;
in response to interpreting the first input data, update the user interface for output to the display device, the user interface updated to include the list of the plurality of ordered items, the details panel of the first ordered item, and the vertically-draggable pointer pointing from the details panel of the first ordered item to the second position in the list;
receive second input data from at least one input device, the second input data interpreted to include confirming placement of the first ordered item for placement in the list of the plurality of ordered items according to the second position; and
in response to interpreting the second input data, update the list by placing the first ordered item in the list of the plurality of ordered items according to the second position, and update the user interface for output to the display device to show the first ordered item placed in the list according to the second position.

15. The system according to claim 14, wherein the processor is operative to interpret the input data to include dragging the vertically-draggable pointer from pointing at the first position in the list and dropping the vertically-draggable pointer to pointing at the second position in the list.

16. The system according to claim 14, wherein the vertically-draggable pointer includes an alphanumeric description indicating where the first ordered item will be placed in the list of the plurality of ordered items.

17. The system according to claim 14, wherein the plurality of ordered items are a plurality of rules.

18. The system according to claim 14, wherein the list of the plurality of ordered items includes a name of each ordered item of the plurality of ordered items.

19. The system according to claim 14,
wherein
the range includes an upper end defining an uppermost portion of the range,
the range includes a lower end defining a lowermost portion of the range, and
at least one of the upper end or the lower end is not identified via the user interface and is spaced from ends of the second ordered item.

20. A method comprising:
preparing a user interface for output to a display device, the user interface including a list of a plurality of ordered items, a details panel for adding or editing details about a first ordered item of the plurality of ordered items, and a vertically-draggable pointer pointing from the details panel to a first position in the list, the vertically-draggable pointer extending from the details panel such that a portion of the details panel extends onto the list;
updating the user interface for output to the display device, the user interface updated to include the list of the plurality of ordered items, the details panel of the first ordered item, and the vertically-draggable pointer pointing from the details panel of the first ordered item to a second position in the list, the second position having a range extending vertically along a second ordered item of the plurality of ordered items and only along the second ordered item such that positioning the vertically-draggable pointer anywhere along the range is interpreted as a placement command and positioning the vertically-draggable pointer anywhere outside of the range is not interpreted as the placement command; and
updating the user interface for output to the display device to show the first ordered item placed in the list according to the second position.

21. The method according to claim 20,
wherein
the range includes an upper end defining an uppermost portion of the range,
the range includes a lower end defining a lowermost portion of the range, and
at least one of the upper end or the lower end is not identified via the user interface and is spaced from ends of the second ordered item.

\* \* \* \* \*